(12) United States Patent
Comsa et al.

(10) Patent No.: US 9,781,735 B2
(45) Date of Patent: Oct. 3, 2017

(54) METHODS AND SYSTEMS FOR IN-DEVICE INTERFERENCE MITIGATION

(75) Inventors: Virgil Comsa, Montreal (CA); Diana Pani, Montreal (CA); Christopher Cave, Dollard-des-Ormeaux (CA); Stephen E. Terry, Northport, NY (US); Sylvie Gomes, Douglaston, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 13/209,383

(22) Filed: Aug. 13, 2011

(65) Prior Publication Data

US 2012/0207040 A1    Aug. 16, 2012

Related U.S. Application Data

(60) Provisional application No. 61/373,539, filed on Aug. 13, 2010, provisional application No. 61/389,030, filed on Oct. 1, 2010, provisional application No. 61/410,645, filed on Nov. 5, 2010, provisional application
(Continued)

(51) Int. Cl.
*H04W 72/12* (2009.01)
*H04W 36/20* (2009.01)
*H04W 88/06* (2009.01)

(52) U.S. Cl.
CPC ........ *H04W 72/1215* (2013.01); *H04W 36/20* (2013.01); *H04W 72/1284* (2013.01); *H04W 88/06* (2013.01)

(58) Field of Classification Search
CPC ............. H04W 72/1215; H04W 36/20; H04W 72/1284; H04W 88/06
(Continued)

(56) References Cited

U.S. PATENT DOCUMENTS

| 8,180,298 B2 | 5/2012 | Drude et al. |
| 8,213,374 B2 | 7/2012 | Harada et al. |

(Continued)

FOREIGN PATENT DOCUMENTS

| CN | 101160999 A | 4/2008 |
| EP | 1744571 A | 1/2007 |

(Continued)

OTHER PUBLICATIONS $3^{rd}$ Generation Partnership Project (3GPP); "LS on in-device coexistence interference", R2-103495, TSG-RAN WG4, 3GPP TSG RAN WG2 Meeting #70bis, Stockholm, Sweden, Jun. 28-Jul. 2, 2010, 2 pages.

(Continued)

*Primary Examiner* — Chuong M Nguyen
(74) *Attorney, Agent, or Firm* — Condo Roccia Koptiw LLP

(57) ABSTRACT

Methods and apparatus for mitigating in-device interference are described. The methods may include an in-device interference event (e.g. an interference situation), and the processing of events may depend on the priority of the technologies. A handover to another frequency or radio access technology (RAT) may occur in case a co-existing technology may be activated. The network may signal to the device a list of frequencies or RATs that it may be allowed to measure and handoff to. A network may provide a scaling value that the device may use to speed up reaction to the interference. The device may apply a scaling factor to an "out of synch" counter and/or the radio link failure (RLF) timer used for the RLF procedure. The device may apply different scaling factors for the measurements and time to trigger events. The device may trigger a report to the network requesting gaps for an alternate RAT.

65 Claims, 15 Drawing Sheets

Related U.S. Application Data cation No. 61/430,704, filed on Jan. 7, 2011, provisional application No. 61/441,963, filed on Feb. 11, 2011, provisional application No. 61/471,060, filed on Apr. 1, 2011.

(58) Field of Classification Search
USPC ...... 370/318, 328–338; 455/450–455, 552.1, 455/553.1
See application file for complete search history.

(56) References Cited

U.S. PATENT DOCUMENTS

| | | |
|---|---|---|
| 2007/0109973 A1 | 5/2007 | Trachewsky |
| 2007/0173283 A1* | 7/2007 | Livet ..................... H04W 88/06 455/552.1 |
| 2009/0046641 A1* | 2/2009 | Wang .................. H04W 74/002 370/329 |
| 2009/0180451 A1* | 7/2009 | Alpert ............... H04W 72/1215 370/338 |
| 2010/0061326 A1* | 3/2010 | Lee et al. ....................... 370/329 |
| 2010/0067433 A1 | 3/2010 | Cheng et al. |
| 2010/0137025 A1* | 6/2010 | Tal ......................... H04B 15/02 455/553.1 |
| 2010/0304685 A1* | 12/2010 | Wietfeldt .......... H04W 72/1215 455/67.11 |
| 2011/0009136 A1* | 1/2011 | Mantravadi ........... H04W 88/06 455/501 |
| 2011/0243047 A1* | 10/2011 | Dayal ................... H04W 16/14 370/311 |
| 2012/0289278 A1* | 11/2012 | Huschke ............. H04W 52/146 455/522 |

FOREIGN PATENT DOCUMENTS

| | | |
|---|---|---|
| JP | 2013-534798 A | 9/2013 |
| JP | 2013-538499 A | 10/2013 |
| WO | WO 2008/133309 A1 | 11/2008 |
| WO | WO 2009/127690 A1 | 10/2009 |
| WO | WO 2010/033413 A1 | 3/2010 |
| WO | WO 2012/010104 A1 | 1/2012 |
| WO | WO 2012/019561 A1 | 2/2012 |

OTHER PUBLICATIONS

Huawei et al, "Open Issues on TDM solution for LTE-WiFi coexistence", R2-110384, 3GPP TSG-RAN WG2 Meeting #72bis, Dublin, Ireland, Jan. 17-21, 2011, 6 pages.

Intel, "Timeline analysis of TDM solutions for coexistence with Bluetooth", R2-110654, 3GPP TSG-RAN WG2 Meeting #72bis, Dublin, Ireland, Jan. 17-21, 2011, 9 pages.

3rd Generation Partnership Project (3GPP), R2-103949, "Kickoff for SI on Interference Avoidance for In-Device Coexistence", CMCC, 3GPP TSG-RAN WG2 Meeting #70bis, Stockholm, Sweden, Jun. 28-Jul. 2, 2010, pp. 1-4.

3rd Generation Partnership Project (3GPP), Tdoc R2-103900, "Methods for WLAN/Bluetooth In-Device Coexistence Interference Avoidance", Ericsson, ST Ericsson, 3GPP TSG-RAN WG2 #70bis, Stockholm, Sweden, Jun. 28-Jul. 2, 2010, pp. 1-3.

$3^{rd}$ Generation Partnership Project (3GPP), R2-103644,"Discussion on In-device Coexistence Interference Avoidance", MediaTek, 3GPP TSG-RAN WG2 Meeting #70bis, Jun. 28-Jul. 2, 2010, Stockholm, Sweden, 3 pages.

* cited by examiner

METHODS AND SYSTEMS FOR IN-DEVICE INTERFERENCE MITIGATION

CROSS-REFERENCE

This application claims benefit under 35 U.S.C. §.119(e) of provisional U.S. Patent Application Ser. Nos. 61/373,539, 61/389,030, 61/410,645, 61/430,704, 61/441,963, and 61/471,060, the disclosures of which are incorporated herein by reference.

BACKGROUND

Today, many wireless devices support multiple radio technologies and/or applications. For example, currently available wireless devices may include multiple components or devices including transceivers, transmitters, or receivers. Such components may support different radio technologies and/or applications including long term evolution (LTE) technologies such as LTE and LTE-Advanced (LTE-A), Industrial, Scientific and Medical (ISM) technologies including Bluetooth technologies and wireless local access networks (WLAN) technologies such as Wi-Fi, and global positioning system (GPS) technologies.

While the support of multiple wireless technologies and applications have increased the capabilities of wireless devices, such support has also led to interference in wireless devices. For example, LTE technologies such as LTE Time Division Duplex (TDD) may operate in band 40, which includes a 2.3-2.4 GHz frequencies, in a wireless device. ISM technologies and/or GPS technologies may operate on adjacent bands and frequencies in the same wireless device. Thus, LTE technologies, ISM technologies including Bluetooth technologies and Wi-Fi, and/or GPS technologies may operate on adjacent bands in the same wireless device thereby causing a transceiver receiving or transmitting signals for the LTE technologies to generate interference with a transceiver receiving or transmitting signals for the ISM technologies including Bluetooth technologies and Wi-Fi and/or GPS technologies and vice versa. Additionally, the radio technologies and/or applications may also cause interference amongst themselves. For example, multiple LTE technologies in a wireless device such as LTE and LTE-A may operate on adjacent bands thereby causing interference between, for example, the devices or components such as transceivers that are used for such LTE technologies in the wireless device.

To mitigate such mutual interfere caused by multiple radio technologies and applications supported by such wireless devices, filter technologies such as active band pass filters have be employed. Unfortunately, such filter technologies do not provide sufficient rejection of adjacent bands and frequencies used by multiple radio technologies and/or applications in a wireless device, and, thus, such filter technologies have not properly mitigated mutual interference created by multiple radio technologies and/or applications in the wireless device.

SUMMARY

Systems and methods for avoiding or mitigating interference between in-device technologies are disclosed. In an embodiment, interference between radio access technology (RAT) components in a wireless device may be mitigated. For example, an interference situation between a first RAT component and a second RAT component in the wireless device may be detected.

In one embodiment, a notification of the interference situation may then be transmitted to a network. The notification may be proactive, e.g. determined in advance of an actual interference situation, or reactive, determined after an interference situation may have been detected. The notification of the interference situation to a network may include information configured to be used to mitigate the interference situation. The network may then determine one or more actions, methods, rules, procedures, configurations, and/or protocols that may need to be processed and/or performed to mitigate the interference situation. Information such as configuration information including an indication of such actions, methods, rules, procedures, configurations and/or protocols may be received by the wireless device and processed such that an action may be performed by the wireless device to mitigate the interference.

According to another embodiment, a notification of the interference situation may not be provided to a network (e.g. a radio link failure (RLF) may occur). In such an embodiment, the wireless device may perform one or more actions, methods, rules, procedures, configurations, and/or protocols to mitigate the interference (or e.g. the RLF) without assistance from the network.

BRIEF DESCRIPTION OF THE DRAWINGS

The following detailed description may be better understood when read in conjunction with the appended drawings. For the purposes of illustration, there is shown in the drawings exemplary embodiments; however, the subject matter is not limited to the specific elements and instrumentalities disclosed therein.

DETAILED DESCRIPTION

Figure 1A:
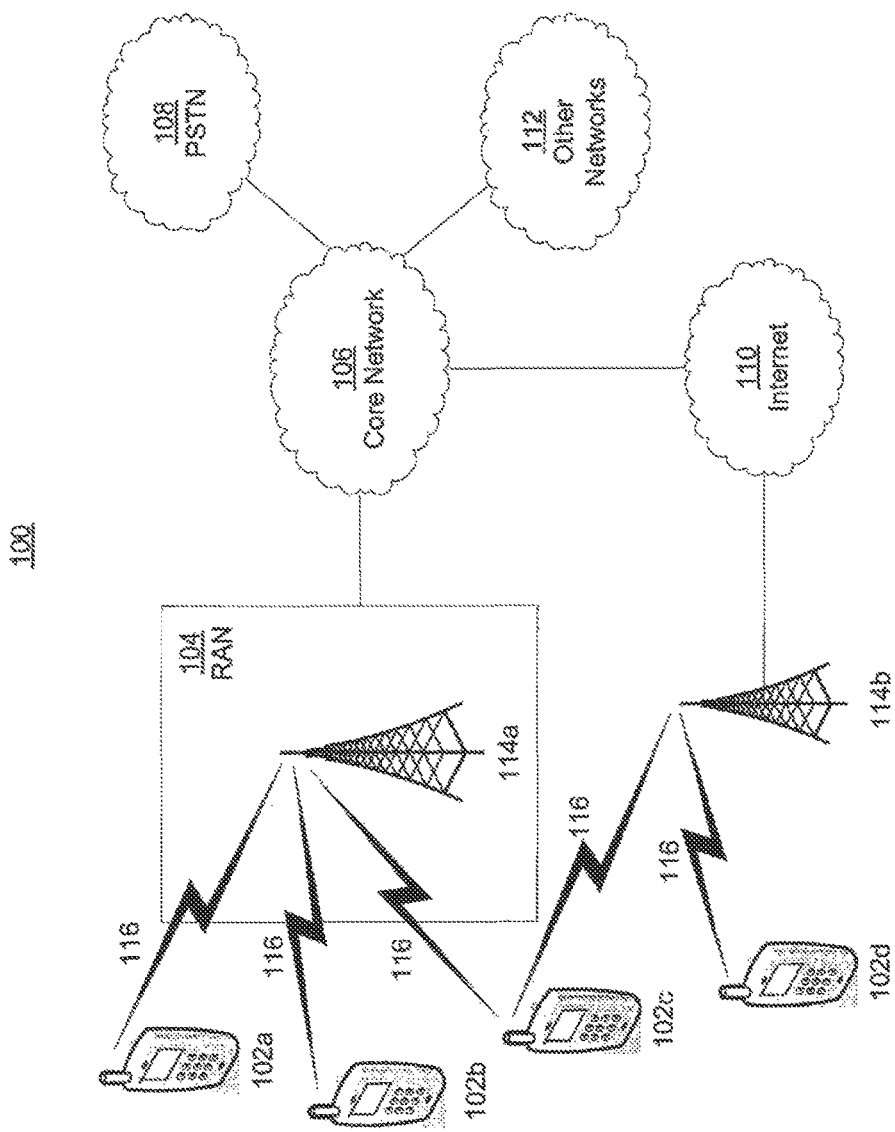
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SCFDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (ESC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoiP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
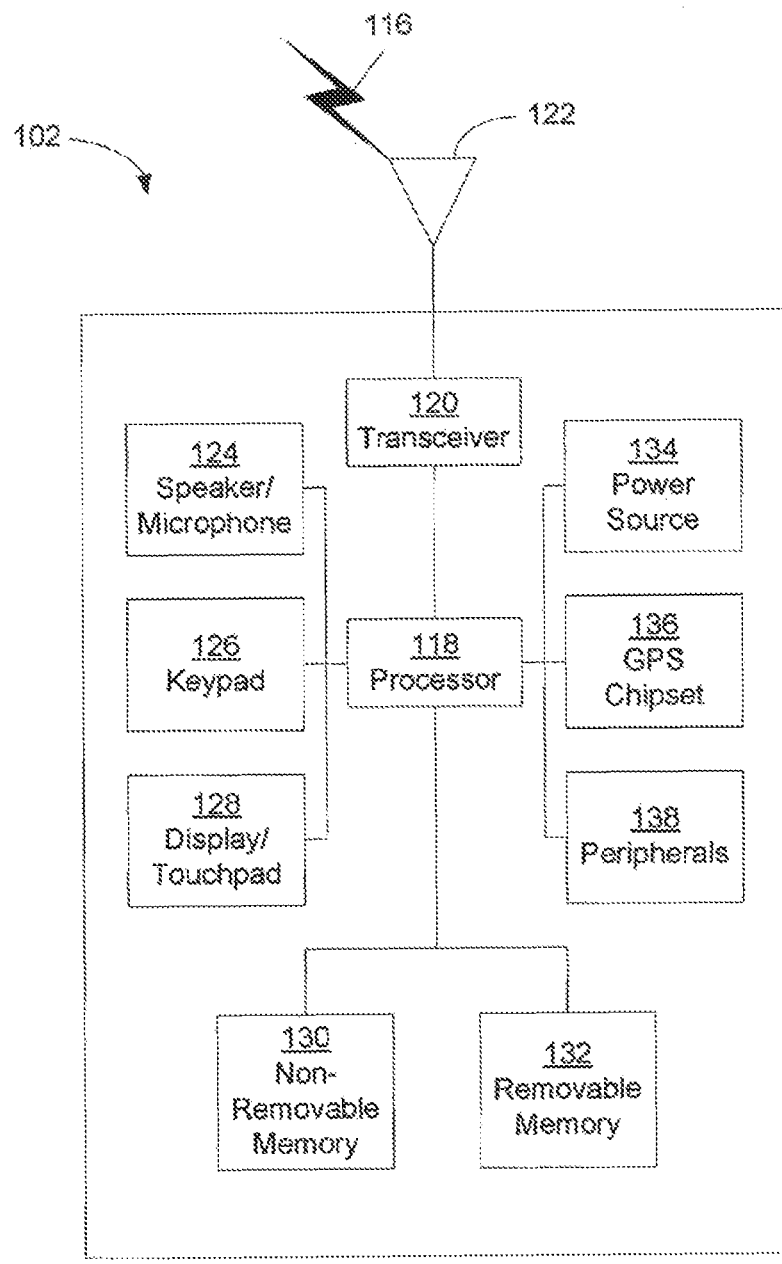
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, nonremovable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors m association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
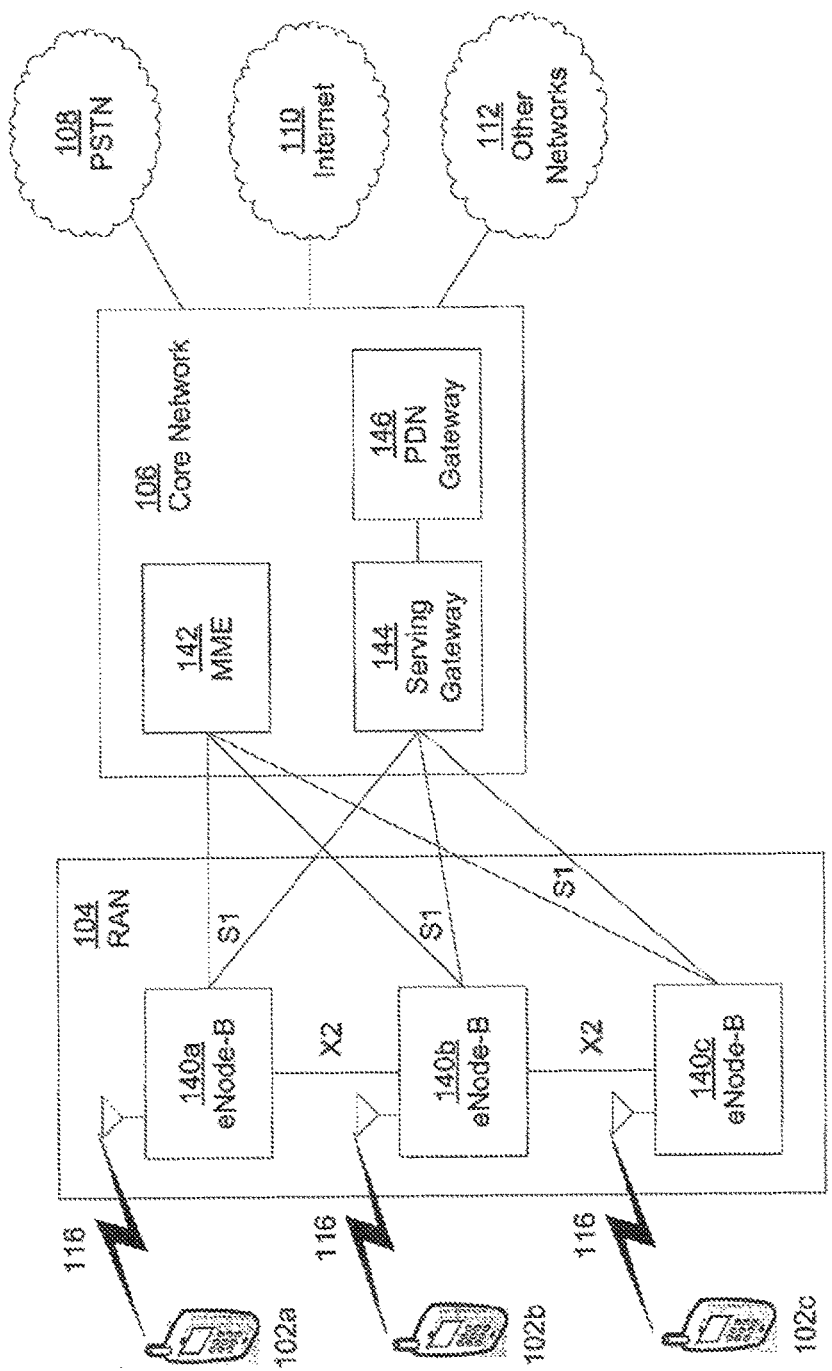
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an 81 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as G8M or WCDMA.

The serving gateway 144 may be connected to each of the eNodeBs 140a, 140b, 140c in the RAN 104 via the 81 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRU s 102a, 102b, 102c with access to packet-switched networks, such as the Internet 110, to facilitate communications between the WTRUs 102a, 102b, 102c and IF-enabled devices.

The core network 106 may facilitate communications with other networks. For example, the core network 106 may provide the WTRUs 102a, 102b, 102c with access to circuit-switched networks, such as the P8TN 108, to facilitate communications between the WTRUs 102a, 102b, 102c and traditional land-line communications devices. For example, the core network 106 may include, or may communicate with, an IP gateway (e.g., an IP multimedia subsystem (IM8) server) that serves as an interface between the core network 106 and the P8TN 108. In addition, the core network 106 may provide the WTRUs 102a, 102b, 102c with access to the networks 112, which may include other wired or wireless networks that are owned and/or operated by other service providers.

According to an example embodiment, a wireless device such as a WTRU or UE including, for example, the WTRUs shown in FIGS. 1A-1C, a router, a computing device such as a laptop, table, e-reader, and the like, an eNodeB (eNB), and the like may support multiple radio technologies and/or applications as described above such that the multiple radio technologies co-exist with each other in the wireless device. As such, the spectrums for such radio technologies may result in interference between components in the wireless device supporting such technologies. For example, LTE technologies, Industrial, Scientific and Medical (ISM) technologies including Bluetooth® and WiFi technologies, Global Positioning Satellite (GPS) technologies, or any other suitable radio technologies and/or applications may be deployed in adjacent or overlapping frequency bands such that interference may exist between components or devices supporting such radio technologies when, for example, signals are being received and/or transmitted by the components or devices at the same time using the adjacent or overlapping frequencies or bands.

Figure 2:
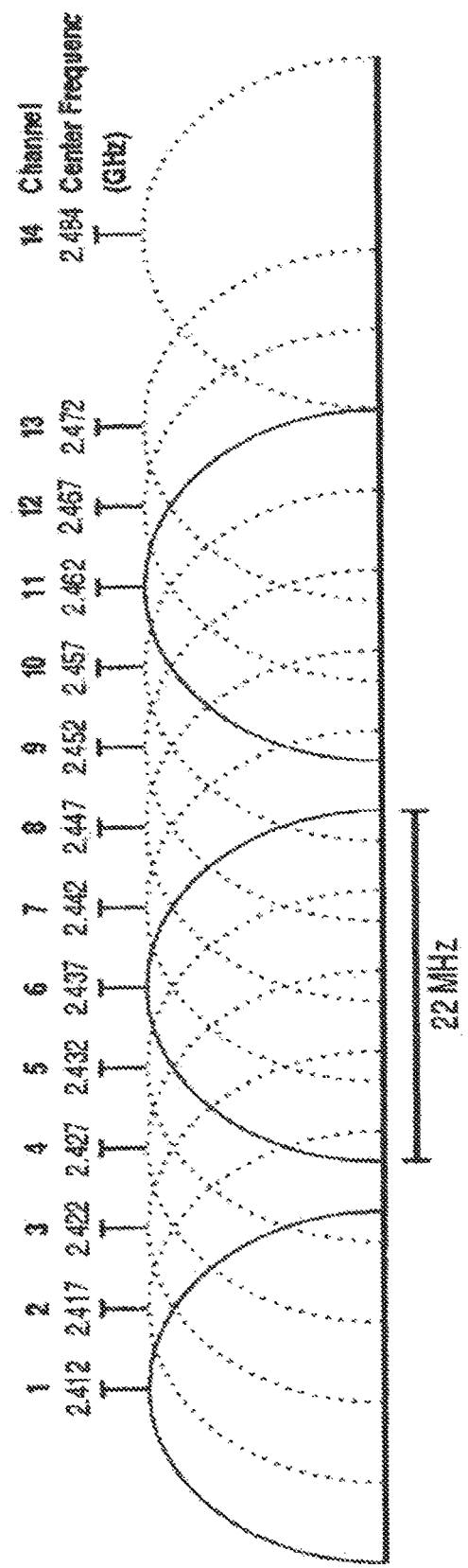
FIG. 2 depicts an example embodiment of non-limiting frequency ranges and channels that may be used by embodiments disclosed herein.

For example, ISM technologies included in the wireless device may use the globally unlicensed ISM 2.4 GHz short-range radio frequency band. Such an unlicensed ISM 2.4 GHz short-range radio frequency band may be used to support Bluetooth® and WiFi technologies as well other ISM technologies. For example, Bluetooth® technologies in the wireless device may be deployed in an 2450 MHz band using frequency hopping spread spectrum over 79 channels of 1 MHz each in the range 2402-2480 MHz range with Time Division Duplex (TDD). WiFi technologies in the wireless device may also be deployed on channels in a frequency spectrum of about 2.4 to about 2.5 GHz as shown in FIG. 2. For example, WiFi technologies may be deployed on channels. As shown in FIG. 2, the frequency band that may support such channels may be overlapping within the frequency spectrum (about 2.45 o about 2.5 GHz). Since such frequency bands may be overlapping, the assignment of the channels in the wireless device may be restricted to specific channels (e.g. every $5^{th}$ channel) to enable sufficient separation (e.g. 5 MHz). As such, in one embodiment, the channels used by the wireless device to support WiFi may be channel 1 (using a 22 MHz frequency band centered at 2.412 GHz), channel 6 (using a 22 MHz frequency band centered at 2.437 GHz), and channel 11 (using a 22 MHz frequency band centered at 2.462 GHz) as shown in FIG. 2. In some embodiments, the signals generated at such channels may also be attenuated by at least 50 dBr from its peak energy at 11 MHz from the center frequency due to the spectral mask thereof.

Additionally, LTE technologies included in the wireless device may be deployed on adjacent band as the ISM technologies that may be included in the wireless device such as the Bluetooth® and WiFi technologies described above. For example, the wireless device may support LTE TDD band 40 in Release 10 (LTE R10) with Carrier Aggregation. LTE TDD band 40 in LTE R10 with Carrier Aggregation may use an entire band up to 100 MHz, or alternatively may receive a 2380-2400 MHz band to transmit and/or receive signals associated therewith.

In an example embodiment, when a component or device that may be included in the wireless device supports the LTE TDD band 40 in LTE R10 using the 2380-2400 MHz band, the co-existence of that component or device with components or devices that may be included in the wireless device to support ISM technologies deployed at about 2.4 GHz such as Bluetooth® and WiFi may be problematic due to the vicinity (e.g. adjacent or overlapping) of frequencies or bands. For example, if a wireless device includes a first component that supports LTE TDD band 40 in LTE R10 and a second component that supports Bluetooth® or WiFi, interference may develop or be created when the first component may be transmitting or receiving data or information on the 2380-2400 MHz band and the second component may be activated to transmit or receive data or information using a 2.4 GHz band.

In another embodiment, the wireless device may include a GPS component such as a GPS receiver. The GPS component may be easily de-sensed by other components supporting other radio access technologies such as transmitters working in the 768 MHz frequency range through a second harmonic component. For example, one or more components supporting a TDD technology (such as a receiver (Rx) and transmitter (Tx) working on the same frequency) may operate in an interference prone region or frequency division duplex (FDD) technology with transmitters (aggressors) or receivers (victims) working in a harmonic induce interference region. The components supporting the TDD technology or other components in the wireless device may have to react quickly to mitigate possible Low Noise Amplifiers (LNA) saturation leading to a complete loss of communication capabilities with their paired access point (AP)/base station(s) or disrupting the communication channel(s) of a system based on carrier sensing (CS) technology thereby acting as a jammer. In one embodiment, the GPS component supporting GPS technologies including Galileo and Glonass systems, may be jammed as a result of such a harmonic created the component supporting, for example, the TDD and FDD technologies.

According to another embodiment, the wireless device may include a plurality of components or devices that may support different LTE technologies. The co-existence of such components in the wireless device may create interference amongst the various LTE technologies supported therein. For example, a first component included in the wireless device to support one LTE technology may create interference with a second component in the wireless device to support a different LTE technology when the first and second component may be transmitting and/or receiving signals at the same time.

Described herein are methods, procedures, rules and/or protocols that may enable mitigation of such an interference that may be created or exist in i a wireless device that supports multiple radio access technologies ("a multi-RAT device") including, for example, prediction or detection of an interference situation (e.g. a potential interference or actual measured interference) in the multi-RAT device; reporting or notifying an interference situation to a network; solutions or mechanisms for preventing an interference situation in the multi-RAT device; recovery from an interference situation in the multi-RAT device; and in-device inter-radio access technology (RAT) coexistence operation procedures used for an interference situation in the multi-RAT. The following methods, procedures, rules, and/or protocols described herein may be used in any variation and/or combination.

The proposed solutions are described for simplicity by way of example in the context of the known case of LTE and ISM and/or GPS devices mutual interference. However, the solutions are not limited or bounded to this case and may be applicable to other wireless technologies.

Additionally, the following terminology for the multicarrier systems may be used herein: RAT—Radio Access Technology); Pcell—Primary Cell, (where the main control signaling takes place including cell (such as Scell) activation/de-activation procedures, DL assignments and UL grants, UL HARQ and CQI feedback, and may be the mobility anchor); Scell—Secondary Cell, (carrying traffic, it may be measured regularly and may be configured and active or de-activated); ISM device or other RAT device—the aggressor transmitter, (possibly in a nonlicensed ISM band); and WTRU or wireless device receiver—the operator licensed spectrum related technology.

Additionally, an LTE device, LTE or LTE technology may refer to a spectrum developed technologies such as LTE, LTE-A, Universal Mobile telecommunications System (UMTS), Global System for Mobile Communications (GSM), Worldwide Interoperability for Microwave Access (WIMAX), Advanced Mobile Phone System (AMPS), Code division multiple access (CDMA) and the like. Additionally, when referred hereafter a Global Positioning System (GPS) device, GPS receiver or GPS refers to any global positioning technology such GPS, Galileo or Glonass.

Figure 3:
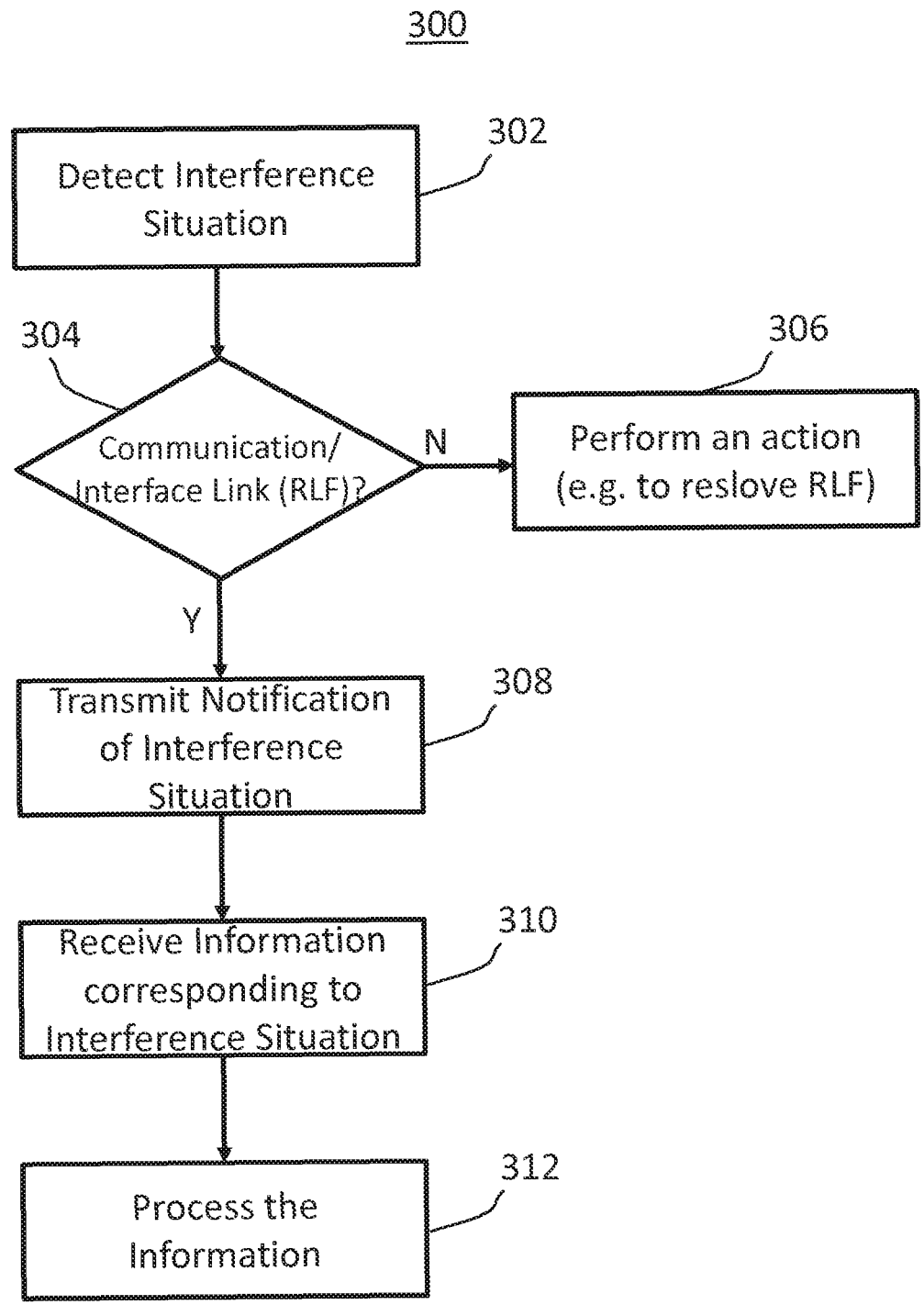
FIG. 3 depicts an example embodiment of a method for mitigating interference between components in a wireless device such as a Wireless Transmit/Receive Unit (WTRU)

FIG. 3 depicts an example embodiment of a method 300 for mitigating or reducing interference between one or more components such as transceivers, receivers, modems, controllers, applications, processors, and the like that may support different radio access technologies and/or applications in a wireless device such as a WTRU or UE such as the WTRUs shown in FIGS. 1A-1C, a router, an eNodeB, a computing device such as a laptop, desktop, server, tablet, e-reader, and the like ("a multi-RAT device"). As shown in FIG. 3, at 302, an interference situation in a wireless device between a first device or component supporting a radio access technology and a second device or component supporting another radio access technology may be detected or identified.

Figure 4:
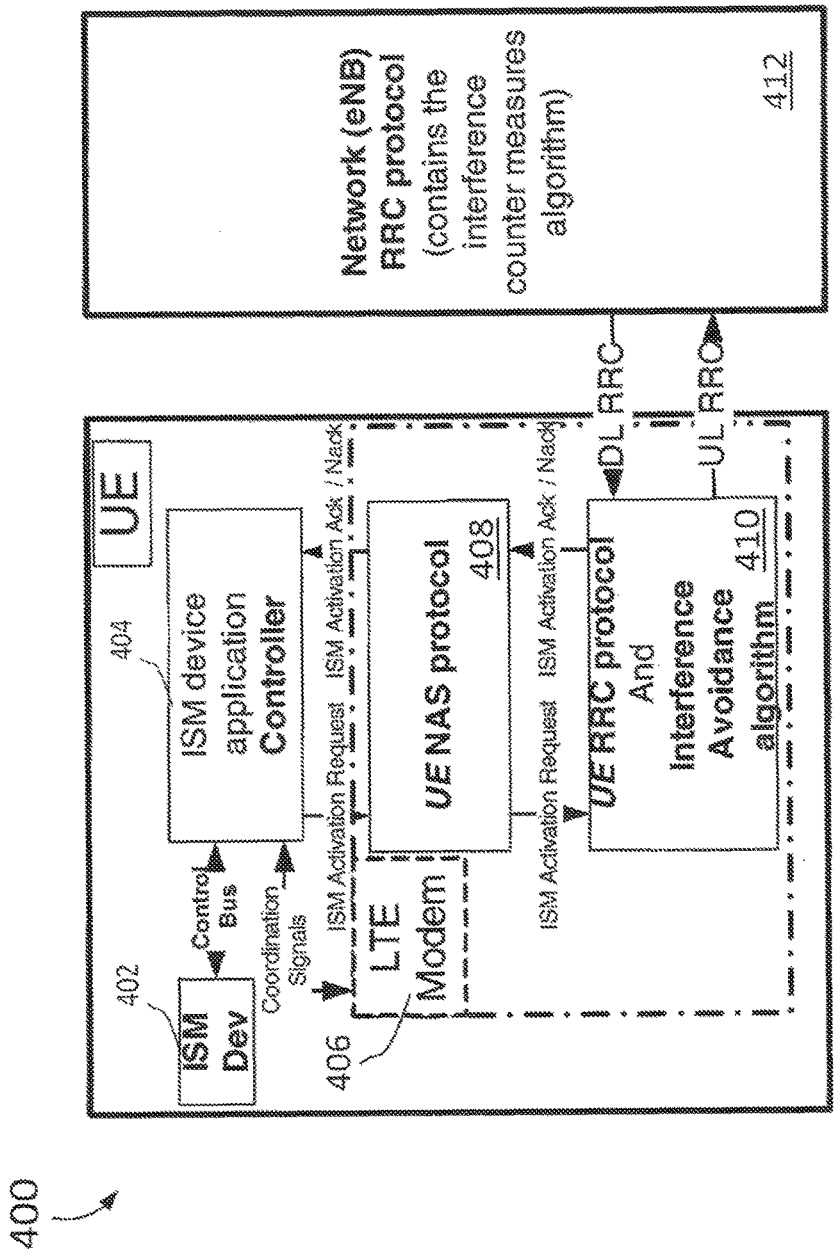
FIG. 4 depicts an example embodiment of a potential interfering technology device application controller and protocol stack.

For example, as described above, a wireless device may include multiple devices or components such as transceivers, receivers, modems, controllers, applications, processors, and the like that may support multiple radio access technologies and/or applications such as LTE technologies including LTE, LTE-A, UMTS, GSM, WIMAX, AMPS, CDMA, E-UTRAN, and the like; ISM technologies including, for example, Bluetooth® and WiFi, and the like; GPS technologies including GPS, Galileo, Glonass, and the like; and/or any other radio access technology. FIG. 4 illustrates an example embodiment of a wireless device 400 such as a WTRU, router, eNodeB, computing device including, for example, a laptop, desktop, server, tablet, e-reader, and the like with multiple components that support multiple radio technologies ("a multi-RAT device"). As shown in FIG. 4, the wireless device 400 may include an ISM device 402. The ISM device 402 may include one or more components such as transceivers, receivers, modems, controllers, processor, applications, and the like that may support ISM technologies including transmitting and/or receiving signals on frequencies or bands associated with ISM technologies. The ISM device 402 may be in communication with an ISM application controller 404 that may be configured to activate the ISM device 402 such that the ISM device may receive and/or transmit signals on the frequencies or bands associated with ISM technologies. The ISM application controller 404 may further be configured to process such transmitted and/or received signals in one embodiment.

As shown in FIG. 4, the wireless device 402 may further include one or more LTE devices or components such as LTE device 406 that may be in communication with the ISM controller 404, for example. The one or more LTE devices or components such as the LTE device 406 may include various modules, devices, and/or components including, for example, one or more transceivers, modems, applications, processors, stacks, storage or memory devices, and the like. For example, as shown in FIG. 4, the LTE device 406 may include an LTE modem 406 and a protocol stack and module 408 associated with the LTE modem 406. According to an embodiment, the one or more LTE devices or components such as the LTE device 406 including the LTE modem 408 and the protocol and stack module 408 may be configured to transmit, receive, and/or process signals transmitted and/or received on the frequencies or bands associated with LTE technologies.

The wireless device 400 may also include an interference detection and avoidance module 410 as shown in FIG. 4. The interference detection and avoidance module 410 may include one or more components such as storage modules, processors, transceivers, and the like that may detect an interference situation between components supporting the radio access technologies, generate a notification including information associated with such an interference situation, transmit or send such a notification, receive information including an action configured to mitigate such an interference situation, process the received information such that the action may be performed, and may perform a mitigation action when signals can not be sent or received by the wireless device.

In an example embodiment, the wireless device 400 may further include other components or devices that support radio access technologies such as a GPS component (not shown). The wireless device 400 may also be in communication via, for example, a wireless link with a network 412. According to example embodiments, the network 412 may be any suitable network (or components thereof) associated with a radio access technology such as the RAN 104, base station 114a, 114b, etc., and the like shown in FIGS. 1A-1C that may enable data transmission and/or receipt (such as cellular, text, video, IP, multimedia, and the like transmission and/or receipt) to the wireless device 400 via one or more communication links such as air interfaces on one or more frequency bands.

Referring back to FIG. 3, as described above, at 302, an interference situation between a first component or device supporting a radio technology and a second component or device supporting another radio technology may be detected or identified. For example, at 302, the wireless device such as the wireless device 410 shown in FIG. 4 or a component therein such as the interference detection and avoidance module 410 may detect or predict an interference situation between a first component or device supporting an LTE technology such as the LTE device 406 and a second component or device supporting an ISM technology including, for example, Bluetooth® or WiFi such as the ISM device 402. At 302, the wireless device may also detect or predict an interference situation between a first component or device supporting an LTE technology and a second components or device supporting a GPS technology. The interference situation that may be detected or predicted, at 302, may be potential or actual interference caused by the first and/or second components operating on adjacent or overlapping frequency bands according to an example embodiment.

According to an example embodiment, the wireless device may detect or predict an interference situation, at 302, based on one or more triggers including proactive triggers, reactive triggers, and the like. In response to such triggers, the wireless device may then notify the network or RAN of such an interference situation (e.g. at 308), which will be described in more detail below.

For example, the wireless device may include or recognize a set of proactive triggers that when identified (e.g. at 302) may indicate an interference situation may occur (e.g. a potential interference situation). Such triggers may rely on the fact that the interfering device may be operating in the same physical node (i.e. the wireless device) and as such, relies on some communication between the two devices or components (e.g. the first and second components) within the same wireless device.

More specifically, once the wireless device or UE may determine that the ISM or GPS may need to be activated for reception purposes, the wireless device or UE may notify the network that the transmission of one radio technology may cause interference to the reception of the other co-existing radio technology. For example, the wireless device may notify the network that the uplink transmission of LTE may cause interference to the other technology (ISM or GPS) radio reception. In another example, the UE may notify the network that the co-existing other technology radio transmissions may cause interference to LTE.

According to an example embodiment, the proactive triggers to notify the network may include one or a combination of the following: the co-existing technology may be activated or is going to be activated (e.g. the other radio technology could notify the RAT such as LTE in the same device that it may activate its transmission and/or reception function) and/or the coexisting technology may provide an indication that it may need or may be scheduled to receive data in the downlink (DL) or that it may be transmitting data in the UL and therefore potentially interfere with the reception of LTE.

Another possible proactive trigger that may be used to trigger an interference event may be when a technology or component may need to reaquire or acquire a signal such as when a GPS device may have to reacquire or acquire the satellites or almanac data, for example due to a satellite health problem indication, or almanac data timer expiration.

The wireless device may also include or recognize a set of reactive triggers that (e.g. at 302) may indicate an interference situation may be occurring (e.g. an interference situation). Such reactive triggers may rely measurements on the interfered device and may or may not necessarily rely on communication between the two technologies within the same wireless device.

According to one embodiment, the reactive trigger may be based on a comparison of a measured interference with a threshold, a scaling factor being applied to one or more measurements such as measured interference, a predefined level of interference being generated and identified on the downlink channels of a technology, and the like. For example, in an embodiment, the wireless device may detect an interference situation (e.g. at 302) when the interference measured by the wireless device or a component included therein may exceed a threshold (e.g. when a RSRQ, RSRP, and/or CQI value may exceed a threshold). Additionally, the wireless device may detect an interference situation when different scaling factors may be applied to the measurements and as a result exceed a value or a threshold. The wireless device then may subsequently provide or transmit a notification to the network of such an interference situation (e.g. at 308).

The reactive trigger may also be based on one or more events (e.g. based on the in-device knowledge that a interfering technology is active) or one or more conditions. For example, the wireless device may detect an interference situation (e.g. at 302) when in-device knowledge that an interfering technology may be activated may be recognized and/or that the RSRQ, RSRP, and/or CQI being below a threshold for a period of time (e.g. during interfered subframes or an average of interfered and non-interfered subframes).

According to yet other embodiments, additional triggers may also be used by the wireless device to detect or report an interference situation (e.g. at 302), including, for example, a handover being initiated and/or an interference situation persisting after the handover, a mode of operation being changed, a usage scenario change, a service scenario change, an interference scenario change, a timer expiring, a predetermined amount of load is be generated in the interfered or interfering technology, a buffer size is above a predefined threshold in the interfering technology, and the like, and then may be used to generate or transmit a notification of the interference situation (e.g. at 308), which may be described in more detail below. According to an example embodiment, a usage scenario, as described above, may be a predefined set of usage scenarios that may described how and what service or services may be running over each technology and what type of interference may be being generated. Such usage scenarios may include, but are not limited to, LTE+BT earphone (VoIP), LTE+BT earphone (multimedia service), LTE+WiFi portable router, LTE+WiFi offload, LTE+GNSS, and the like.

At 308, a notification associated with the interference situation may be transmitted or reported. For example, at 308, a wireless device such as the wireless device 400 shown in FIG. 4 or a component therein such as the interference detection and avoidance module 410 or the technology being interfered or interfering may transmit, provide, or report a notification of the interference situation to a network such as the network 412. Thus, at 308, the wireless device may notify the network of an existence of an interference situation that may potentially exist or that may actually exist between one or more components supporting multiple radio access technologies. As described above, the notification may be transmitted, at 308, based on one or more triggers that may be used to detect the interference situation at 302.

In one embodiment, the notification may be transmitted, provided, or reported to the network, at 308, when a communication link or interface link used to transmit and/or receive data with the network may be established at 304 as shown in FIG. 3. For example, the interference situation may create enough interference to prevent a communication or interface link from being established with the network (e.g. a radio link failure (RLF) may occur). If or when a communication or interface link may not be established at 304 (e.g. when a RLF may occur), an action may be performed by the wireless device, at 306, to mitigate or reduce the interference at least enough to establish a communication or interface link, which will be described in more detail below. Once the communication or interface link may be established at 304, (e.g. the RLF may be resolved) the notification may then be provided to the network at 308 as described herein.

According to one embodiment, if the interference situation may be detected while the wireless device or UE may be in idle mode or to notify the network that the wireless device may be capable of in device coexistence procedures, the wireless device may transmit, provide, or report the notification to the network, at 308, via an RRC Connection establishment procedure, or as part of the wireless device capabilities, via a new field in a RRC message. For example, the wireless device may notify the network of the interference situation (i.e. provide a notification to the network) using a RRC connection request message or a RRC connect setup complete message or another RRC message that may include or provide a more elaborate list of wireless device capabilities. The notification may also be provided to the network at the registration time or reselection with a routing area update message or via a MAC control element. This notification may be sent at the time one of the above mentioned triggers is or it may be sent when a RRC establishment procedure is triggered by the UE due to other reasons if the conditions above still hold.

According to an embodiment, a new in-device interference event (hereinafter referred to as "event C1") or a new RRC message (e.g. in device interference report) or RRC report may be introduced or used to send a notification or report indicating an interference situation in the wireless device (e.g. at 308). is the event C1 may be an event that may occur between one technology in the wireless device and the network. For example, example, in an LTE environment, the event C1 may be configured by the network and triggered when an interference situation may be detected as described above. Such a situation may trigger the wireless device or UE to send a measurement report indicating that this event has been triggered (e.g. at 308). The same may be applicable if a new RRC message may be used or an existing RRC message is extended.

According to an example embodiment, the criteria to trigger a RRC measurement report with event C1 or any new RRC message or any existing RRC message may be related to the UE detecting or predicting an interference situation according to any of the embodiments described above. For example, the notification may include the type of component or device that may be interfering or that may cause an interference situation, if not already reported, and optionally the time at which the interfering device or component may be activated. Alternatively, the notification may include an indication that such a component device is or may be activated, whether the detected interference situation may be reactive or proactive (e.g. whether the interference may be actual or potential interference), frequency bands served by the components or devices, or any other suitable information as described below. An existing event may also be extended by the wireless device to include in-device interference information in the notification.

Additionally, in one embodiment, the notification may include an indication that an in device interference situation exists or will exist. For example, the wireless device or UE may notify the network that an interfering or interfered technology may need to be turned on or activated (e.g. a potential interference situation may exist) or that the interfering device is active (e.g. an actual interference situation may exist). The wireless may also notify the network that an interference situation exist in the current serving frequency or in another serving frequency. The notification information may serve as assistant information to the network to assist the network in determining the best mechanisms to relieve interference in the UE. The notification may include information associated with the interference situation trigger; an indication that a previous interference situation may have stopped; information identifying the types of technologies (e.g. Bluetooth, WiFi, GPS) causing the interference situation as well as information associated with an existence of other co-existing interference components or technologies in the wireless device including whether such components or devices may be powered on or off, actively transmitting or receiving, generating or not generating interference, in a particular mode of operation, continuously transmitting data (e.g. for a predetermined period of time), may have data in a buffer exceeding or below a threshold, and the like;

information or an indication of the capability of the wireless device to handle or process in-device co-existence and/or interference mitigation methods, rules, protocols and/or procedures, or any other suitable indications or information that may be used by the network to help mitigate or reduce the interference situation (actual or potential), which will be described in more detail below.

As described above, the notification may include information associated with the device or component type inducing the status of the device or component that may cause interference via an interference situation. For example, in one embodiment, if the component or device to be turned on is a GPS receiver, and the wireless device may be configured to operate a component or device for LTE in one of the problematic frequency bands operating (e.g. in a frequency band when the UL harmonics may jam the victim GPS receiver), then the wireless device may signal, via the notification, the device type (GPS in this particular case) along optionally with the state or status of the device or component such as the GPS state or status of cold, warm or steady state and/or possibly the time or estimated time for entering steady state.

The notification may also include a hopping frequency and/or other bits that may be used to provide frequency band adaptation. For example, in one embodiment, a component or device such as a Bluetooth® transceiver may be or may need to be activated at the same time as a component or device supporting, for example, LTE. Upon activation, the wireless device may signal, via a notification, the hopping frequency range or a capability bit for the frequency hopping adaptation range associated with the Bluetooth® technology, or equivalent the problematic frequencies associated with the in-device technology (e.g. the frequencies in which an inteferring situation would exist). In one embodiment, after receiving such information, the network, which may be an LTE supported network, may adapt its own frequency allocation range to avoid, mitigate, or reduce mutual interference between the components or devices supporting the LTE technology and the components or devices such as the Bluetooth® transceiver supporting the Bluetooth technology. Alternatively, the network, which may be a Bluetooth or ISM network, may use the received frequency hopping range to adapt the component or device associated therewith and, thus, avoid, mitigate, or reduce the mutual interference between the Bluetooth® component or device and other ISM devices or components, LTE components or devices, and GPS components or devices.

In addition to the information above, the notification may also include a list of frequency bands supported or affected by the components or devices of the radio access technologies such as the LTE, ISM, and GPS technologies used by the wireless device. For example, the wireless device may also signal to the network, at 306, a list of frequencies or frequency bands it supports for the component or device (e.g. the frequencies that may be supported without interference from the co-existing technology) or that may cause interference on that device, (e.g. the list of frequencies that cannot be supported for the component or device because of interference generated by the co-existing technology, e.g. the problematic frequencies). In one embodiment, the list of frequencies or frequency bands the wireless device may support for a particular component or device, may correspond to the list of frequencies the WTRU supports that do not cause or are not interfered on the LTE side, or the list of frequencies that are supported for the other technology that may not be interfered by LTE, and/or the list of frequencies that may be supported by the other technology. It may also be understood that the list of frequencies may be reported as a range, as frequencies within a band, as frequencies within a RAT, via the notification, at 308.

The notification may also include an indication of the urgency of an application that may need or that may have turned on the interfering component or device including, for example, the type of service (e.g. a certain QoS priority) or type of application (e e.g. Transmission Control Protocol (TCP), User Datagram Protocol (UDP), Voice over Internet Protocol (VoIP), real-time transport protocol (RTP), and the like). The notification or information provided to the network by the wireless device may also include the buffer size for the given technologies that may be or will be activated. In other embodiments, the notification or information may also include an indication on whether the interfering radio access technology may be interfering the downlink (DL) LTE reception or whether the uplink (UL) LTE may be interfering with the other radio access technology; information associated with the type of data being transmitted or received (or requested for transmission or receipt) (e.g. a usage scenario) by, for example, the interfering technology including whether the data may be voice, video, text, multimedia, and the like; or any other information associated with the interfering or victim technologies including additional information about the data being or requested to be transmitted or received as well as component or device types, characteristics, and setups, and the like. For example, the network may have a predefined set of services or scenarios such as Bluetooth® earphone voice and LTE voice, or Bluetooth® voice and LTE video, multimedia service, LTE+WiFi portable router, and the like. Depending on the usage scenario detected or requested, the wireless may signal an index to the set of predefined usage scenarios provided by the interfering or victimized technology.

Additionally, the notification may include information or an indication associated with the capability of the wireless device to handle and/or process a solution to the interference situation. For example, the notification may include an indication that the wireless device may support of any of the solutions such as methods, rules, protocols, and/or procedures described below that may mitigate the interference caused by the interference solution. Alternatively, the notification may include an indication of a separate capability that may indicate support for time division multiplexing (TDM) schemes in the wireless device. For example, as described above, a capability/notification indicating the presence of in-device interference or an interference situation may be signaled or transmitted to the network. The capability/notification may include an indication that the wireless device supports the procedures associated with reporting the interference situation of the wireless device and/or the TDM scheme operation.

As described above, additional events or actions may trigger a transmission of a notification to the network at 308. For example, in addition to a detection of an interference situation between components of a wireless device as described above, a notification to the network, at 308, may also be triggered when, for example, a handover operation may be initiated, a mode of operation may be changed, a change of service or usage scenario may be detected, a timer or predefined period of time has elapsed, a device or component may need to reacquire a signal such when a GPS device has to reacquire the satellites or almanac data due to a satellite health problem indication, or almanac data timer expiration as or any other suitable change, modification, and the like the wireless device or the radio access technology.

Such triggers may also cause additional information to be included in the notification that may be transmitted at 308. For example, the notification transmitted by the wireless device to the network may include a request for A-GNSS assistance to retrieve the almanac and/or other important data that may bring the component or device such as the GPS receiver to at least in a warm state. Upon receiving such a request the network (positioning server) may reply to, for example, the wireless device with the requested information if supported. According to one embodiment, such a request may be carried using a NAS message (an UL Direct Transfer Message for example) to a positioning server of the network based on the Positioning Device state (cold, warm, steady or satellite health data problem).

In another embodiment, the notification or report may include information associated with a source cell. The wireless device may then trigger another notification or report to, for example, the network, a target eNodeB, and/or a new cell, when the handover takes place and an interference situation may still exist. For example, if the wireless device may be using a pattern to co-exist with the other technology, the wireless device may additionally report the pattern being used to the new cell. According to another embodiment, the notification or report may be triggered once by the source cell (e.g. in a response to the interference situation or a request). The wireless device may then rely on the network nodes to relay the information from the source cell to the target cell in the handover information exchange.

Additionally, the notification may include information associated with a change in a mode of operation. For example, as described above a notification or report may be triggered when a change in a mode of operation may be detected. If the wireless device or an active ISM device such as a WiFi component or device or a Bluetooth® component or device may move into a sleep or power saving mode, the wireless device transmit a notification or report to the network that indicates that the wireless device or the active ISM device has entered sleep or power saving mode. When the wireless device or the active ISM device exits the sleep or power saving mode, a notification or a report may further be transmitted to the network indicating such a change. Additionally, the transitions between sleep and active mode may also be used as triggers for being in an interference situation. For example, when a wireless device exits power saving mode or sleep mode, an access point (AP) associated with the WiFi network may receive a notification and the WiFi device may detect a poll from the access point (AP), indicating that it has data for that station, or the station (STA) polls the AP and determines that data is available for the wireless device.

Alternatively, the notification may include information associated with a change of service or usage scenario. For example, in one embodiment, the wireless device may detect a change from Bluetooth® (BT)+LTE (voice) usage scenario to a BT+LTE (multimedia) usage scenario or the wireless device may detect a change from a lower priority to a new higher priority service, such as Voice or a new web-browsing session, both of which may trigger a notification or report being transmitted by the wireless device to the network that may include information associated with the change.

In one embodiment, the notification or report may trigger the notification or report being transmitted by the wireless device to the network (and may include information associated with the expiration of the timer). For example, a report may be transmitted if a predefined period, x, has elapsed since the WTRU last transmitted an in-device report. More specifically, a prohibit timer may be implemented or used. The prohibit timer may be may be a configurable parameter or a predefined value. Once the wireless device has triggered a notification or report, a notification prohibit timer may be started and the wireless device may not be allowed to trigger another report for the duration of a prohibit timer. Once the notification prohibit timer expires, if the triggering condition may still exist, the notification is transmitted to the network. Such a concept may be applicable, for example, when the notification or report may be transmitted or generated using RRC, MAC, and the like.

Additionally, in another embodiment, the notification may include information associated with the buffer size of one or more of the components or devices associated with the supported RAT technologies as well as an indication or information associated channel whether the UL or DL may be interfered with during transmission/reception.

While the method 300 disclosed herein including transmitting or providing a notification at 308, it may be understood, however, by one skilled that the methods, solutions, rules and/or protocols described below can be equally applicable without transmitting such an initial capability notification or interference situation notification being provided at 308. Additionally, the wireless device may be explicitly configured to report or stop reporting in-device co-existence indications. More specifically, the wireless device may continuously report or transmit notifications. If the network wants to avoid further triggering of such notifications, the network may remove the reporting configuration from the wireless device or alternatively, explicitly indicate to the wireless device to stop reporting such notifications.

It may be further understood that the wireless device may trigger the notification or report based on any of the above mentioned triggers, but may not indicate the reason of the trigger (e.g. a notification of an interference situation may be provided to the network and may include the information described herein but may not indicate whether the interference situation is a potential interference situation or actual interference situation (e.g. may not indicate whether the interference is based on reactive or proactive triggers). It may be also understood that the solutions described herein may equally be applicable for the other technology that may be interfered by the LTE technology or may be interfering the LTE technology. Similarly, when the wireless device may determine that an LTE technology wants to be power up, or may be requesting to establish a RRC connection, a message (a notification) may be triggered and transmitted to the network of the other technology, indicating the LTE technology and the frequency band the LTE technology may currently be configured to support as well as other frequencies that may be supported thereby. In this way the aggressor and victim RATs may be controlled by the wireless device. The solutions described herein can be used individually or in combination.

Referring back to FIG. 3, at 310, information including, for example, an action configured to mitigate, reduce, or avoid the interference situation may be received (e.g. configuration information for the wireless device may be received). The information may then be processed, at 312, such that the interference situation may be mitigated, reduced, prevented, or avoided. For example, in one embodiment, after providing a notification of the interference situation to the network at 308, the network may assist the wireless device in preventing anticipated or potential or interference associated via one or more solutions or procedures, which may be described in more detail below. To provide such assistance, the network such as the network 412 shown in FIG. 4 may provide information or solutions including one or more actions, procedures, rules, or protocols to the wireless device, which may receive the information or solutions at 310. The wireless device such as the wireless device 400 and/or one or more components therein such as the interference detection and avoidance module 410 may then process the information or solutions to mitigate, avoid, or reduce the interference situation reported to the network at 308.

More specifically, in one embodiment, when the network receives a notification or capability at, for example, 308, the network may transmit or perform one or more of the following procedures that may be received by the wireless device at 310, for example, and processed by the wireless device or a component or module therein to mitigate, reduce, or avoid the interference created by the interference situation.

The network may configure the wireless device (or the WTRU or UE) for in-device interfering situation reporting and monitoring. For example, the wireless device may be configured with event C1, or an existing event that has been extended. Upon such configuration, the wireless device may start monitoring and reporting an interference situation notification according to the triggers described above. Information associated with such an event may be received by the wireless device, at 310, and processed by the wireless device, at 312 such that the event may be performed or configured.

The network may also provide the wireless device with information associated with a network capability, including an indication regarding whether network may be capable of handling in-device interference mechanisms. Such information may be provided and received by the wireless device, at 310, in a RRC connection setup message, or any other RRC message and processed, at 312. Such information may also be determined by means of a lack or presence of configuration of a reporting event or message.

The network may further provide a back of or scaling value to the wireless device that may be received at 310. The wireless device may then process the backoff or scaling value, at 312, such that the wireless device may use the backoff or scaling value to limit the reaction to the interference once it is generated, as described in more detail below.

Alternatively, the network may send a new measurement configuration message to the wireless device with a list of other frequencies and/or RATs that the wireless device may start to measure and such a new measurement configuration message may be received at 310. The new measurement configuration message may then be processed at 312 to start measuring the frequencies and/or RATs included in the list.

According to another embodiment, the network may perform controlled activation of an interfering RAT component or device. For example, both the victim RAT component or device and the interfering RAT component or device may need to be or may already be activated. In such a situation, the network may perform one or more of the following methods, rules, procedures, and/or rules and may also provide information associated therewith to the wireless device, which may be received at 310 and processed at 312.

For example, in one embodiment, when an activation request or an interference situation from a co-existing RAT device may be detected (resulting in an interference situation e.g. at 302), the RAT device (that would generate interference if transmitting) may not be immediately activated. The co-existing RAT device or traffic activation may be delayed by a predefined period of time, in an effort to allow time for the other device (e.g. victim RAT device) to take appropriate actions to avoid the interference. According to an example embodiment, the network may notify the wireless device of such a delay in information received thereby (e.g. at 310). The wireless device may then delay activation of the RAT device (e.g. at 312). Given that the connection requirement in the co-existing device may be dependent on the technology (e.g. whether it may be WiFi, Bluetooth, LTE, GPS, and the like), the value of the delay timer may depend on the technology, or the application or service that may be requesting the activation of the device according to an embodiment. It may also be understood that the delay timer described herein may not be implemented or configured. In such a situation, the device may be activated without any delay.

According to another embodiment, the network may also send the wireless device a notification to allow RAT device such as an ISM device to start, which may be received and processed by the wireless device (e.g. at 310 and 312). This notification may be a MAC control element (CE) order, piggybacked into an existing RRC message or a new RRC message. Alternatively, the network may send the wireless device a notification to deny ISM device to start, which may be received and processed by the wireless device (e.g. at 310 and 312), when, for example, no alternate solution or pending data in the base station buffer is to be sent. According to an example embodiment, this may also depend on the priority of data being transmitted by the other RAT device such as an LTE device.

Alternatively, the network may send the wireless device an ISM activation time notification, which may be received and processed by the wireless device (e.g. at 310 and 312). The ISM activation time notification may be a number of frames, sub-frames or multiple of values in ms or seconds based on an estimation of the remaining data in the buffer to be sent and channel conditions. This activation time may be coupled with a reconfiguration message that may be any of the above listed solutions, (handover, carrier(s) deactivation, RAT redirection). This notification may be a MAC CE order, piggybacked into an existing RRC message or a new RRC message. The wireless device may activate the ISM device only after the expiration of the signaled activation time.

The solutions such as methods, rules, procedures, and/or protocols described herein and the triggering and configuration of the events may also depend on the priority of the radio access technologies, (e.g. LTE may have priority over GPS, or vice versa). In addition, the type of service being provided by the technology may also be additional criteria. More specifically, if an emergency call is being carried out on one technology, it may be beneficial to instruct the co-existing technology to not transmit for a period of time, which may be received at 310 and processed at 312, for example. The wireless device may also not trigger the reporting as described herein. For example, after receiving information or instructions, at 310, to not transmit or activate a component of the co-existing technology for a period of time, the instructions or information may be processed at, for example, 312 such that the wireless device may suspend activation of the component associated with the co-existing technology, which will be described in more detail below.

Additionally, if high priority traffic is being transmitted, such as but not limited to emergency call, Earthquake and Tsunami Warning System (ETWS), or any type of emergency warning messages, it may be beneficial for the other technology to not transmit. In one embodiment, this may be carried out autonomously in the wireless device. For instance, when such a type of traffic may be detected, the wireless device may instruct the ISM to stop transmitting. Alternatively, an explicit message or information sent from the network to the wireless device (e.g. received at 310) may also be processed (e.g. at 312) and used. More specifically, the message may instruct the wireless device to stop ISM transmission and the LTE technology may instruct the other technology to stop. The same may be applicable to the other technology in case a high priority service is taking place. The LTE technology may in turn report this situation to the network such that the network knows not to schedule the wireless device for a predefined period of time that may be signaled in the report.

For example, in an embodiment, the wireless may delay the activation, (or transmission/scheduling), of a RAT component or device such as an ISM device for a predefined period of time based on the information received from the network (e.g. at 310) and processed by the wireless device (e.g. at 312). Upon expiration, the ISM device may then be turned on, (or scheduled for transmission/reception), regardless of the operations or the actions that took place on the LTE side. The activation delay timer may depend on the service being requested at the ISM device end or the type of ISM device. Similar concepts or procedures may also be applicable for LTE, where if a certain ISM activity or procedure is taking place, the LTE side delays activation, (e.g. transmissions of data, even if scheduled by the network), for a defined period of time. Once this time elapses the WTRU may resume normal LTE operation.

Alternatively, an LTE device included in the wireless device may explicitly command the ISM to remain turned off. If the LTE device explicitly commands the ISM device to remain turned off, the wireless device may cancel the delay activation timer and backoff for a predefined period of time, (e.g. not reattempt for at least the back-off time). Once the backoff timer expires the wireless device may trigger another indication or notification and perform the actions received therefrom or included therein as described above. According to one embodiment, the actions where the other technology is not enabled may be required and enforced for certain LTE application types such as emergency calls or high priority messages, such as but not limited to ETWS.

Additionally, if a handover command or a redirection occurs in the LTE side, the ISM device may be activated prior to the delay timer expiring. Or if a TDM pattern as described herein may be provided to the wireless device, the device may enter active mode and perform transmission/reception procedures according to the provided pattern. Upon successful completion of one or a combination of the above actions, the wireless device may then start the ISM device or abort the request if a denial order from the network has been received.

According additionally embodiments, the wireless device may not receive (e.g. at 310) information that may include an order or an appropriate action from the network to its notification (e.g. at 308) and a timer associated with one or more components supporting the radio access technologies such as an ISM device activation delay timer may expire. In such an embodiment, the wireless device may perform one or more of the following actions (such actions may also be performed at 306 as well when a RLF may prevent a connection to the network): deny the ISM device activation and notify the user; wait for the ISM device activation delay timer to expire after the last Ack-ed packed and, if there is no data to transmit in the wireless device buffer allow ISM device activation; and/or allow the ISM activation for a limited period defined by the wireless device implementing or network signaled, (similar to DRX cycles).

Upon a failure of the interference mitigation actions, wireless device may deny the activation of the components or devices supporting the radio access technologies such as the ISM device. The activation may be denied for a defined period of time that may be network signaled or defined by the wireless device e.g. in its implementation. Alternatively, the wireless device may restart the notification procedures associated with such components including, for example, the ISM device notification procedures (e.g. the procedures that may have been processed at 312). The number of retries may be limited by a value that may be network signaled or wireless device dependent (e.g. in its implementation) to avoid increasing the signaling load in the network. Such a situation described above may optionally cause an inter-technology handover to be triggered. For example, in one embodiment, such a situation may cause the wireless device to hand off from an LTE to ISM technology, (e.g. to WiFi). Such a situation may also depend on the priority of the data or application that is requesting ISM to be turned on.

In another embodiment, the co-existence of the interfering RATs may be enabled by ensuring that sufficient frequency separation exist between the interfering technologies to reduce the interference to an allowable level (e.g. via frequency division multiplexing of RATs). In such situations, upon receipt of this notification or report, the network may perform one or a combination of the following and may provide information associated therewith to the wireless device, which may be received at 310 and processed at 312.

For example, to enable co-existence of the interference RATs via sufficient frequency separation, a handover to another frequency or RAT may be performed and an indication of such a handover may be received by the wireless device at 310 and processed at 312.

Alternatively, the wireless device may be configured with measurement control information of other frequencies and/or RATs (that according to the notification provided by the wireless device are deemed to be non or less problematic), which may be received at 310 and processed at 312, for example. This may allow the wireless device to have measured other frequencies ahead of time to avoid a radio link failure (RLF), or it may allow the wireless device to report back to the network and perform a handover prior to the degradation of the frequency to another frequency supported such that no interference may be experienced by the other technology or such interference may be mitigated quickly.

Additionally, if a RLF occurs in the wireless device, the wireless device may determine that in-device interference may be ongoing and may perform a RRC reestablishment in another frequency (i.e. instead of performing re-establishment to a cell in the current serving problematic frequency) that may not be interfered by the coexisting technology. Alternatively, the wireless device may immediately transition to idle mode, (e.g. without attempting a reestablishment), and initiate a RRC connection establishment procedure in a new non-interfered frequency. In such cases, cell selection and reselection procedures may be modified to avoid frequency bands in which in device interference is occurring.

Alternatively, the network may send a request for immediate measurements or results that may be received by the wireless device (e.g. at 310) and processed (e.g. at 312) before performing a handover, (for example RRC message with UEinformationRequest) to avoid a handover failure and WTRU falling back on the previous cell.

Furthermore, to enable co-existence with sufficient frequency separation, t a reconfiguration (e.g. received at 310) removing the active carriers, (e.g. disabling the secondary cells or removing the configuration all together) may be performed (e.g. at 312) for the frequencies in the reported interference prone region (e.g. in the list of problematic frequencies) or a inter frequency handover between primary and secondary carriers may be performed (e.g. from a problematic frequency to a non-problematic frequency). The reconfiguration may be received by the wireless device (e.g. at 310) and the wireless device may apply supplementary RF filtering on the remaining operating carriers (e.g. at 312).

A fast change of the Pcell with a configured Scell if the Pcell is in the interference prone region (and Scell is not) may be performed and the information or an indication of the fast change may be provided to the wireless device such that the wireless device may receive the information or indication at, for example, 310 and process the information at 312 to perform a fast cell change.

A redirection to another frequency (e.g. a handover) or RAT may also take place. This may be performed with a RRC Connection Reject or Release message, which may be received and processed by the wireless device (e.g. at 310 and 312). Additionally, a cell change order may be sent to the wireless device (e.g. received at 310) to perform a change of frequency or RAT (e.g. processed at 312).

According to one embodiment, upon a successful completion of a handover, the wireless device may be allowed for the period of the component activity supporting the radio access technology such as the ISM device activity, to maintain a different list of frequencies, RAT priorities in order to avoid a ping pong effect or to remove the problematic frequency out of the candidate list. Alternatively, as described above, the wireless device may report to the network the problematic frequencies such that the network does not provide an indication or configure the wireless device to measure on those frequencies. In yet another embodiment, such a list may be signaled by network in the system information elements or RRC measurement configuration messages and the rules applied in these specific situations.

In another embodiment, the co-existence of the interfering RATs may be enabled by ensuring that time coordination between transmission and/or reception on the RAT devices or components may exist and, thus, limiting the interference generated from one RAT device to another (e.g. via time division multiplexing of RATs). In such situations, upon detection of an in-device interference situation or receipt of the notification or report, one or a combination of the following may be performed by the UE or by the network, which may provide information associated therewith to the wireless device, which may be received at 310 and processed at 312.

For example, a discontinuous reception (DRX) cycles or gaps/patterns that may allow a TDM operation in the wireless device between this RATs (as discussed herein) may be configured, which will be described in more detail below. The wireless device may be further configured with semi persistent scheduling that may allow for a TDM operation in the wireless device or a FDD half duplex operation to allow for a TDM device operation sharing scheme if the wireless device notification/capability signals or information included therein support for such operation. The wireless device may receive such configurations at, for example, 310 and process such configurations at 312.

In another method, simultaneous communication on two or more RAT components or device in the same wireless device (e.g. where operation may be adapted on one or more RAT component so that transmission failures on each RAT are minimized or eliminated) may be performed to ensure time coordination and thus enable co-existence of the RAT components or devices. In such a situation, when an interfering RAT may be detected and/or reported in either the mobile terminal or the network, timing of transmission and reception may be adjusted to enable for operation of the interfering RAT while maintaining the mobile terminals existing connection.

For example, in an LTE system when either the wireless device or an eNB may recognize an in device interference situation, procedures may be applied to coordinate discontinuous transmission (DTX)/DRX or LTE scheduled/unscheduled gaps or an in device pattern between the wireless device and eNB to allow for communication on the alternate RAT while minimizing or eliminating the effect on the LTE connection. In one embodiment, uplink (UL) and downlink (DL) transmissions may be uniquely determined so that enabling and disabling of UL and/or DL transmissions may be independent.

In one method for enabling co-existence via time coordination, when alternate RAT interference may be realized, periodic DTX/DRX cycles on in device time patterns may be coordinated between the wireless device and eNB and provided to the wireless in 310 and processed in 312. The specific cycle and transmission/reception lengths configured may be uniquely associated with the transmission/reception requirements of the particular alternate RAT. For example, the wireless device may trigger a report to the network requesting gaps for the alternate RAT. The request (e.g. received at 310) may include, but is not limited, to one or a combination of the following information: the type of technology; the type of service that the other technology is going to receive/transmit; and/or a required pattern (e.g. length and periodicity) that may be required for the other RAT to be able to properly function, which may be in the form of an index to the allowed DRX patterns in, for example, LTE or a set of predefined patterns to be used for different co-existance usage scenarios or services, or in a more explicit form.

According to an example embodiment, in the case of an 802.x WLAN, upon Access Point search and association, the LTE system may enable specifically designed DTX/DRX or in device patterns that allow for operation on the 802.x RAT, and when the Access Point association is released, the LTE system may disable DTX/DRX operation or the enhanced DTX/DRX operation of the in-device pattern or the TDM scheme. LTE transmissions gaps may be designed to ensure periodic successful 802.x MAC level transmissions in order to maintain higher layer IP protocols. For example, to assist the network to release the gaps, the wireless device may also report to the network that the other technology has been disabled/deactivated or is not continuing to generate interference.

More specifically, in an example embodiment, the wireless device may use an algorithm for transmission time estimation in the 802.x stacks. More precisely, based on 802.x IP stack, buffer size and 802.x radio conditions, the wireless device may evaluate how may transmission cycles may be required to empty the 802.x related buffer. This may be for example expressed as a multiple of LTE sub-frames or frames. The wireless device may send an event or a MAC CE containing the 802.x estimated activity requirements. Additionally, if the 802.x related service requires periodic transmissions, a specific service periodicity flag may be used for the eNB notification.

In another embodiment, the wireless device may request a pattern or request a pattern change upon change of services supported or upon determination of transmission or reception requirements. Establishment of radio bearers or indication from higher layers for establishment or release of particular services may be used to trigger setting of certain TDM patterns. The patterns may also be dynamically adjusted based on the amount UL data to send or estimation of DL data to receive.

Upon receiving the notification or request (e.g. at 308), the network may grant accordingly a DRX cycle or pattern that fulfills the requested service transmissions, possibly an activation time in frames and/or sub-frames, and/or a duration in the number of DRX cycles granted, which may be received (e.g. at 310) and processed (e.g. at 312). Additionally, the information provided to the wireless device may contain duration in number of DRX cycles granted. Such information may be provided via a MAC CE order, an RRC reconfiguration message or a new RRC message or a physical layer indication.

Alternatively, the wireless device may use a secondary DRX configuration that the network may broadcast or provide, via dedicated signaling for WTRUs equipped with interfering technologies, which may be received (e.g. at 310) and processed (e.g. at 312) by the wireless device, and activated based on an order from eNB.

Additionally, the network may deny a wireless device DRX request if the eNB buffer may have data for the WTRU. Upon termination of the RAT activity, the wireless device may notify the eNB using the above methods and resume normal operation. Alternatively, the network may send the wireless device a RRC reconfiguration message or a MAC CE order removing the alternate DRX configuration (which may be received at 310 and processed at 312).

DRX/DTX or LTE scheduled/unscheduled patterns may also be preconfigured and used to ensure co-existence using time coordination. For example, when triggering criteria for a particular pattern may be detected, a preconfigured pattern may be chosen. Each pattern may be known by a particular configured configuration index. The selected configuration index may then be signaled between the wireless device and eNB to synchronize the pattern.

Depending on where the triggering criteria may be detected, the wireless device or eNB may determine which entity signals the requested new DRX/DRX pattern may include]. For proper scheduler operation, a deterministic signaling method may be needed to coordinate the DRX/DTX or LTE scheduled/unscheduled pattern between the wireless device and eNB. MAC CE signaling may be used to identify specific preconfigured DRX/DTX pattern index for example.

Additionally, when a change of pattern or need to change a pattern may be detected, the wireless device may autonomously perform the change of pattern and send an indication of the change and the time. Alternatively, wireless device may notify the network that such a change has taken place, (e.g. a change in required pattern), recommend a pattern or indicate what change has taken place and wait for an explicit order from the network to perform the change, which may be received at 310 and processed at 312. Such a dynamic notification may take place via a MAC CE to identify the change or pattern and the network may signal back or acknowledge the new pattern via another MAC CE or via L1 signaling, or via RRC messaging.

In another method to enable co-existence of RATs via time coordination, fast MAC or PHY signaling may be used to create dynamic requested transmission/reception gaps to allow for transmissions on the alternate RAT. In this method, when transmission/reception requirement may be detected on the alternate RAT, the LTE connection may quickly initiate a pattern for a known period of time to allow for communication on the alternate RAT. In one solution, the patterns may be pre-configured by the RRC. This may be as a result of a report of the presence of a co-existing technology, or as a result of this technology being activated. Once pre-configured, the patterns may be activated/deactivated in a fast basis using MAC or PHY signaling, according to the patterns and requirement of the alternate RAT.

Non-buffer status report (i.e Empty BSR) may also be used to enable co-existence of RATs. In such situations, upon receipt of this notification or report (e.g. at 308), the network may perform one or a combination of the following and may provide information associated therewith to the wireless device, which may be received at 310 and processed at 312.

For example, the wireless device may indicate to the network (e.g. via the notification at 308) that it may not want to be scheduled to avoid interference with the co-existing RAT by sending a new type of Request called, for example, Non Scheduling Request (NSR), to the network. This NSR may be included in a MAC packet data unit (PDU) or as part of an existing MAC CE or a new MAC CE that may be defined.

The NSR may include one or a more of the following pieces of information described below. The NSR may include an enumeration indicating whether Uplink or Downlink scheduling or both should be avoided; a Boolean indicating scheduling avoidance should start or stop; a period of time during which the scheduling may be avoided, which may correspond to the period during which the wireless device may estimate interferences with other co-existing RAT may occur; starting frame and sub-frames for which the scheduling avoidance may start (alternatively the scheduling avoidance may start as soon as the network receives the NSR); ending frame and sub-frames for which the scheduling avoidance may end (alternatively, the scheduling avoidance may end when the network receives another NSR indicating that the scheduling avoidance may be topped); and/or an index to a predefined list of patterns the wireless device may choose from.

The wireless device may then follow one or a combination of the following rules regarding the triggering of the NSR or based on the use of the NSR. If the wireless device may have sent a Empty BSR to the network indicating that the wireless device buffer was empty in the same TTI or within the last X TTIs, the wireless device may not have to send a NSR to the network in this TTI to request UL scheduling avoidance. Alternatively or additionally, the wireless device may send the NSR periodically. A periodic NSR timer may also be defined, which value may be fixed or configured by the network.

The NSR may also be used in combination with the Empty BSR reporting. More specifically, the wireless device may still report the actual buffer status but in addition also include one or a combination of the above described NSR information to indicate that it has a preference to not transmit or to start not transmitting according to a predefined or already configured pattern. The network may enable or disable NSR in the WTRU via RRC configuration or MAC configuration like for instance a new MAC CE.

The wireless device may also send, based on the buffer estimation size and radio conditions of the alternate RAT, (modulation and coding rate), a fast signaling message on physical layer or a MAC CE requesting LTE eNB gaps for alternate RAT transmissions (e.g. at 308). These gaps may be in multiple of frames or sub-frames. The eNB may then send the grant transmission gap length along with a possible start offset in frames or sub-frames, which may be received at 310 and processed at 312.

Alternatively, the eNB may not grant any gap and send a deny notification to the wireless device. Upon receiving a denial of service, and to avoid increasing the network signaling load, the wireless device may implement a back off timer for the alternate RAT (e.g. at 312). Upon expiration of this back off timer, the wireless device may send the alternate RAT service request again. Additionally, a limited number of retries may be signaled by network or be wireless device implementation defined.

According to an example embodiment, criteria for initiating transmission gaps may not be on each 802.x MAC layer transmission. Transmission/reception enabling may additionally be dependent on higher layer TCP or FTP transfers. Switching to/from the alternate RAT may take into account the effect on the higher layer protocol. For example transmissions may be intentionally dropped on one RAT to reduce transmission rate or take into account low priority data which may not essential for service delivery.

Additionally, all requests described herein may be limited by a prohibit timer to avoid frequent requests by wireless devices. More specifically, if a request or indication may be triggered according to any of the embodiments described herein, the wireless device may initiate a prohibit timer (e.g. at 312). If a change occurs and another indication may be a trigger and the prohibit timer may be running, the wireless device may not transmit the request and wait for the expiration of the timer. Upon the expiration of the timer, if the conditions for the trigger still hold, the wireless device may send the pending request. Alternatively, if a request may be triggered while the prohibit timer may be running, the wireless device may cancel the request.

In another embodiment, the network may enable coexistence of the interfering RATs via DRX for TDM schemes. In such situations, upon receipt of this notification or report, the network may perform one or a combination of the following and may provide information associated therewith to the wireless device, which may be received at 310 and processed at 312.

For example, one potential solution for solving the in-devices coexistence (e.g. ICO) issue may be to adopt a Time Division Multiplexing (TDM) scheme which includes ensuring that transmission of a radio signal does not coincide with reception of another radio signal. In LTE, the TDM patterns translate in having scheduled and unscheduled periods configured by the network or suggested by the wireless device.

One way to achieve TDM is via the use of DRX. According to one embodiment, it may be envisioned that the other technology may be transmitting during LTE's inactive time, (unscheduled periods) and not transmit during LTE's active time, (scheduled periods).

Figure 5:
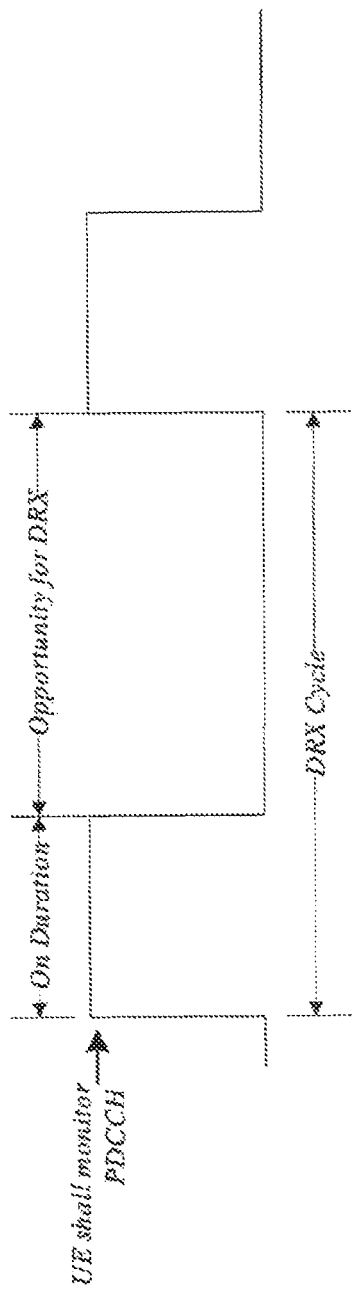
FIG. 5 shows an example discontinuous reception (DRX) pattern for long term evolution with On Duration periods.

The DRX pattern for LTE may be defined with On Duration periods, where the WTRU has to monitor the physical downlink control channel (PDCCH) and periods of opportunity for DRX where the WTRU may be allowed to go to sleep as shown in FIG. 5.

An important concept for DRX may be the Active Time which has the minimum length of the On Duration period and may be indefinitely extended according to network scheduling and wireless device triggers. During the Active Time, the wireless device has to monitor the PDCCH and may transmit or receive. So the problem may be that the wireless device may not be able to stay inactive (i.e. sleep) during the periods of opportunity for DRX since different events may force the wireless device to stay in Active Time or even force the WTRU to wake up from an inactive time and transition to Active Time. Some examples are new DL transmissions, UL grants, pending scheduling requests, random access contention resolution, and hybrid automatic repeat request (HARQ) retransmissions. In the extreme case where the Active Time is indefinitely extended, the wireless device may not have the opportunity to go to sleep and may not be able to coexist with an ISM technology in a TDM scheme. In addition, regardless of whether the WTRU is monitoring PDCCH or not, the WTRU may receive and transmit HARQ feedback when such is expected. This means that even if the wireless device may not be in Active Time, there is still a risk it may receive acknowledgement/negative acknowledgement (ACK/NACK) on physical HARQ indicator channel (PHICH) and transmit ACK/NACK on physical uplink control channel (PUCCH).

One or more solutions described herein may be used for DRX. For example, in one embodiment, DRX schemes may be used allow the coexistence coordination across the different RATs. In order for DRX scheme to be used, however, a number of modifications, enhancements and limitations may need to be modified or included.

For example, for the purposes of co-existence between different RATs, when referred to hereafter, scheduled time may correspond to the time in which LTE is allowed to be scheduled by the network, (e.g. transmitting/receiving) and LTE unscheduled, (or ISM scheduled) may correspond to the time in which the ISM device may be allocated time to either transmit, (when problem is in the DL), or receive when LTE may be causing interference in the UL.

The co-existence may be designed such that the inactive time of the DRX cycle corresponds to a guaranteed LTE unscheduled period and the active time of DRX corresponds to a LTE scheduled period. This may require more dynamic co-ordination between the different technologies. Alternatively, the coexistence may be designed such that the LTE scheduled period corresponds to On Duration. Alternatively, specific scheduled/unscheduled periods/subframes may be/are configured or determined in the wireless device, according to any of the methods described herein.

A benefit of such methods may be that the LTE non-scheduled periods can be more effectively utilized. If the other RAT is aware in advance of the LTE non-scheduled period there is no idle period between detecting the LTE inactivity and initiating transmissions on the other RAT. Additionally the other RAT can continue to transmit until a known end of LTE non-scheduled period without having on going transmissions interrupted. This is especially important in the case of fast switching between RATs where the non-scheduled periods are short.

The embodiments described herein discuss methods to achieve TDM operation using any of the schemes discussed above. Moreover, for the cases where the DRX active time and/or On Duration are not related to the scheduled/unscheduled periods in the WTRU, WTRU behavior while DRX is running and associated patterns are configured are described.

Scheduling Requests may also be used to enable coexistence of RATS and are described herein. For UL LTE→ISM DL interference—problem only for UL transmission-Delay transmission. For UL ISM→LTE DL interference—the WTRU may send the Scheduling request whenever, however the reception of the PDCCH may be corrupt if sent.

Inactivity timers may also be used and are described herein to enable co-existence of RATs. For example, in an embodiment, if the wireless device receives a new UL or DL transmission, the drx-Inactivity timer may be started. During the inactivity timer, the wireless device may remain in active mode where it continuously monitors the PDCCH. If the network schedules the wireless device during this time, the wireless device may continue to remain in active time.

For a wireless device configured to operate in a TDM scheme, to avoid staying in active time for continuous periods of time, the wireless device may perform one or a combination of the following (e.g. at 312).

The drx-Inactivity timer may not be initiated when a new DL or UL Transmission may be received. Alternatively, this may be achieved by introducing a new value for drx-Inactivity timer set to zero. This implies that the wireless device and network may schedule during wireless device OnDuration or during other active time according to triggers other than drx-Inactivity.

In another embodiment, the drx-Inactivity timer may be started and restarted for a predefined period of time and/or N number of times.

The drx-Inactivity timer may also be started/restarted and the wireless device may remain in active mode as long as the current elapsed active time is not greater than LTE scheduled timer, (or a max active time specified). The current elapsed active time may be calculated with respect to the first TTI in which the wireless device transitions to active time, (e.g. at the start of OnDuration).

Alternatively, the drx-Inactivity timer may also be started/restarted and the wireless device may remain in active mode as long as the current elapsed active time may not be greater than (LTE scheduled timer—drx-Inactivity) (or a max active time specified—drx-Inactivity).

Alternatively, the drx-Inactivity timer may be started/restarted if time at which a new DL or UL transmission corresponds to or overlaps with an LTE scheduled transmission.

Alternatively, the drx-Inactivity timer may be started, but if any of the subframes during the wireless device's active time correspond to unscheduled subframes, (as determined by the configured pattern), the wireless device may not perform any UL transmissions during those subframes. The wireless device may further stop monitoring the PDCCH during those subframes. In another solution, the wireless device may monitor the PDCCH according to the normal DRX procedures but may rely on the network to not be scheduled during those times. In a third solution, the wireless device may monitor the PDCCH and if scheduled for UL transmission in the unscheduled subframes, the wireless device may not perform the UL transmission.

Figure 6:
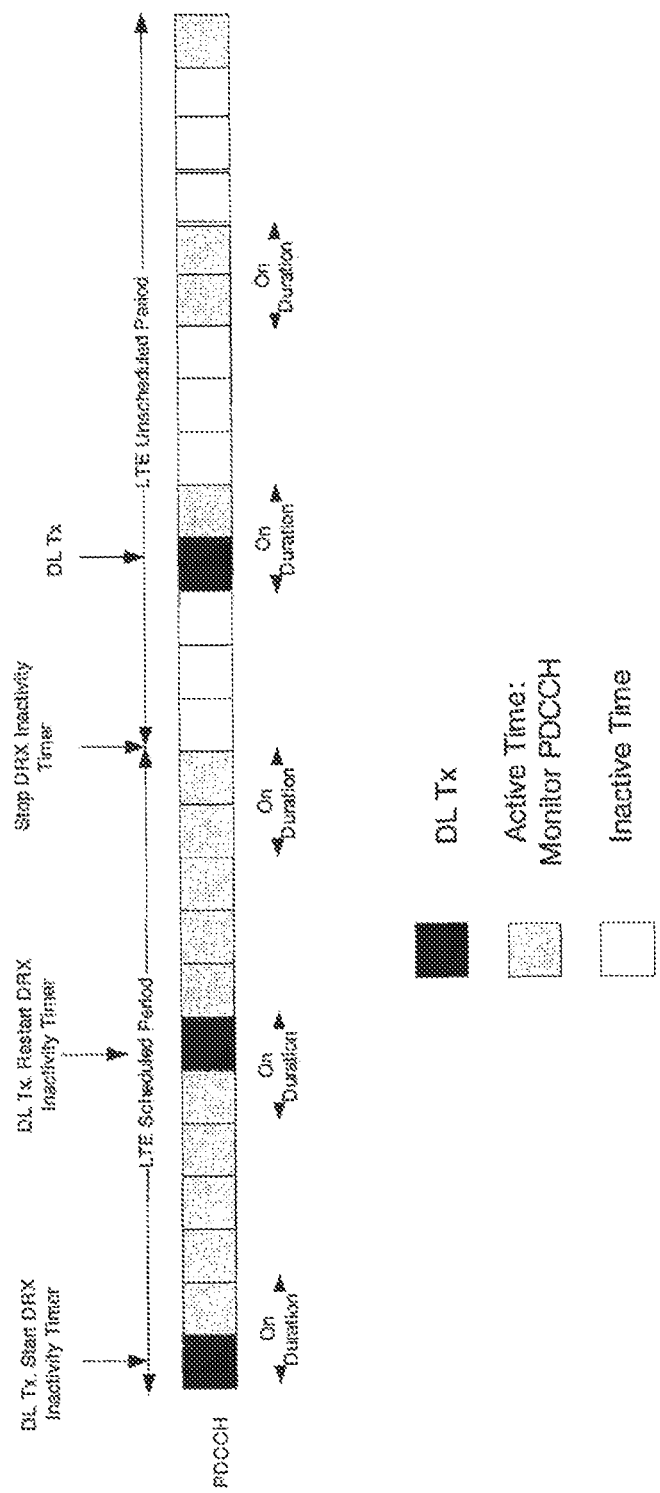
FIG. 6 shows example downlink (DL) retransmissions and DL feedback.

FIG. 6 depict an example diagram of DL retransmissions and DL feedback. As shown in FIG. 6, the wireless device may start or restart the DRX Inactivity Timer if DL transmission occurs during the LTE scheduled period, but that the DRX Inactivity Timer may be stopped if running when the wireless device may enter the LTE unscheduled period and that the wireless device may not start the DRX Inactivity Timer if DL transmission occurs during the LTE unscheduled period.

The wireless device may also transition to active mode when a HARQ round trip time (RTT) timer expires and starts DRX retransmission timer. To limit the active time in the wireless device and therefore decrease the probability of errors, one or a combination of the following may be performed (e.g. at 312).

In an embodiment, the retransmission timer may not be started or used. In such an embodiment, retransmissions may be sent either during the ongoing active periods (e.g. On duration) or the next active period. This may cause some delays in the transmission of data and the QoS requirement for some services may not be met. As an alternative, to avoid retransmission delays, the network may use transmission time interval (TTI) bundling for DL transmissions when the WTRU is operating in such mode.

According to another embodiment, the retransmission timer may be started and the wireless device may monitor the PDCCH only if the active mode corresponds to or overlaps with the allowed LTE scheduled period or max LTE period. More specifically, in one solution if the LTE scheduled period expires while the DRX retransmission timer is running, the wireless device may stop the timer and no longer monitor the PDCCH.

Alternatively, in a second solution the WTRU may still monitor the PDCCH according to the DRX period, but once the ISM scheduled period/subframe starts, the other technology may initiate UL transmission. The network based on the LTE unscheduled period may determine to delay the retransmission or alternatively still schedule the retransmission at a high risk on not properly being decoded in the wireless device. The eNB may increase the transmission reliability of the retransmission knowing that interference may be a problem during this period.

Additionally, if ACK/NACK repetition may be configured, the wireless device may autonomously reduce the repetition bundle size, i.e. the number of consecutive ACK/NACK slots for which the wireless device may have to repeat the feedback, if required to avoid overlapping PUCCH transmissions with its unscheduled period. More precisely, the wireless device may use the ACK/NACK repetition as configured by higher layers during the scheduled period but if the ACK/NACK repetition may be overlapping the scheduled period final subframe and may be supposed to go beyond this limit, the wireless device may be allowed to reduce the ACK/NACK number of repetitions in order to fit the Scheduled period interval. Alternatively, the wireless device may use only single ACK/NACK on PUCCH outside the scheduled periods and use ACK/NACK repetition inside the Scheduled periods. Alternatively, the wireless device may delay the ACK/NACK for the next scheduled period and still use the repetition as configured by higher layers. The network may signal to the wireless device these two different ACK/NACK repetition operation modes when WTRU enters the in-device interference avoidance mode.

UL feedback (ACK/NACK) and UL retransmissions may also be used as described herein to enable co-existence of RATs.

To avoid interference when the WTRU receives ACK/NACK from the network (e.g. at 310), processes the ACK/NACK (e.g. at 312), and retransmits the WTRU data, one or a combination of the following methods may be used.

The wireless device LTE may only send data at sub-frame n when it knows it may have time to receive the feedback and UL grant, (for adaptive HARQ), at sub-frame n+4 in the same LTE Scheduled period or in a future LTE Scheduled period. This may be specified as follows: for sub-frame n, if the wireless device may be in a LTE Scheduled period at sub-frame n+4, the wireless device may send data. For example, in case the LTE scheduled period corresponds to the On Duration period, the wireless device may have to check that On Duration timer may be running at sub-frame n+4 before sending UL data.

According to an example embodiment, the ISM may not transmit 4 sub-frames after last LTE-scheduled period to ensure the ACK/NACK may be properly received.

In case of a NACK, the wireless device may delay the retransmission to the next LTE scheduled period if necessary. The wireless device may also indicate the HARQ process ID to the network on PUCCH in the same sub-frame it is sending the retransmission so that the network may associate the retransmission to a particular HARQ process.

Alternatively, if the retransmission cannot be carried out within the active time or the LTE scheduled period, the wireless device may flush the HARQ process.

Alternatively, the wireless device may maintain the data in the HARQ process, may not transmit the data if the retransmission time occurs outside of the window and for every time the wireless device may not transmit, (e.g. the subframe corresponds to an unscheduled subframe), the wireless device may still continue to increment the HARQ retransmission counter and any other physical layer parameters that are changed for every retransmission. If the maximum number of retransmission is reached during the inactive time, the WTRU may flush the HARQ buffer and discard the data.

Additionally, if the TTI bundling has been configured for uplink transmissions, the WTRU may reduce autonomously the TTI_BUNDLE_SIZE if some of the sub-frames from the bundle occur outside the LTE Scheduled periods.

Figure 7:
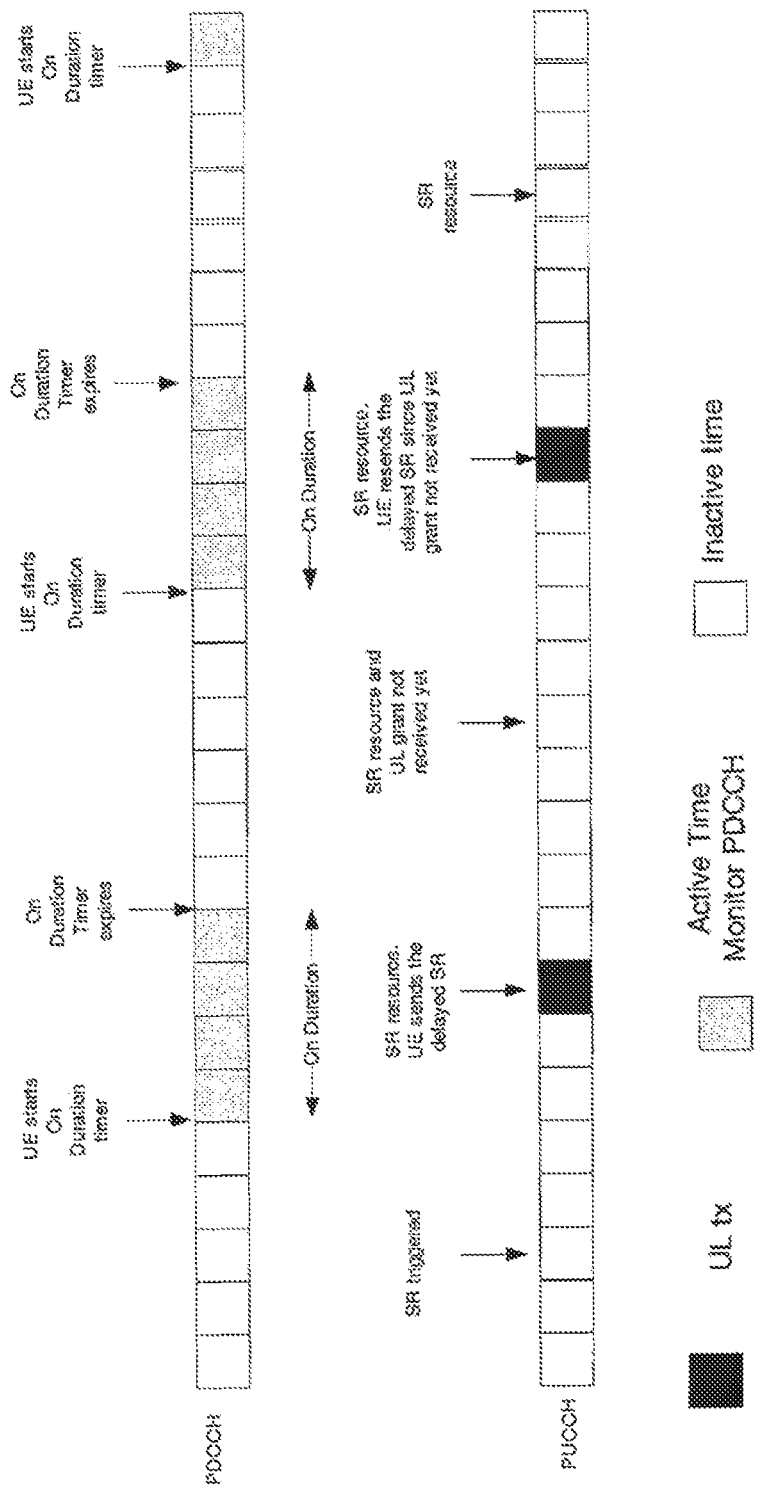
FIG. 7 shows an example scheduling request (SR) diagram.

A Scheduling Request (SR) may also be used as described herein to enable co-existence of RATs, which can be shown in FIG. 7. For example, when an SR may be triggered, the SR may be transmitted in the first available assigned PUCCH resource. Once transmitted, the wireless device may move to active time and continuously monitor the PDCCH until it receives a grant (e.g. at 310). If the wireless device may not receive an UL grant before the wireless device's next SR opportunity and if sr-prohibitTimer is not running, the wireless device may send a new SR.

To provide the coexisting technology with reception opportunities, where no UL transmission interferes with reception of the other technology, the transmission of the SR may be performed according to one or a more of the following rules.

For example, if the SR may be triggered and the first PUCCH resource occurs during an inactive period in the wireless device, (e.g. during an OnDuration or during an active period according to inactivity timer), the SR may not be transmitted. The wireless device may send the SR in the next opportunity that corresponds to a PUCCH resource that is available during the wireless device's active time.

If no PUCCH resources may be available during active or LTE scheduled times, the wireless device may initiate a random access (RA) procedure to inform the network that no valid PUCCH resources are available.

Alternatively, if the SR may be triggered and the first PUCCH resource occurs during LTE unscheduled period, the SR may not be transmitted. The wireless device may send the SR in the next opportunity that corresponds to a PUCCH resource that is available during the LTE scheduled period.

The wireless device may send the SR if the PUCCH resource corresponds to either one of WTRU s active time or LTE scheduled period.

Alternatively, the eNB may ensure that the PUCCH resource assignments are aligned with WTRUs active time or LTE scheduled time.

Additionally, in another embodiment, the eNB may configure the WTRU with Semi-persistent scheduling (SPS) for the UL. The SPS periodicity may correspond to the wireless device's active time or to the LTE scheduled time.

Once the SR may have been transmitted according to the above rules or according to the existing rules, the wireless device may have to transition to active time (e.g. at 312) and continuously monitor the PDCCH to receive an UL grant. However, to ensure that the PDCCH transmission may be correctly received by the wireless device and no ISM interference may corrupt the reception, one or a combination of the following may be performed.

Figure 8:
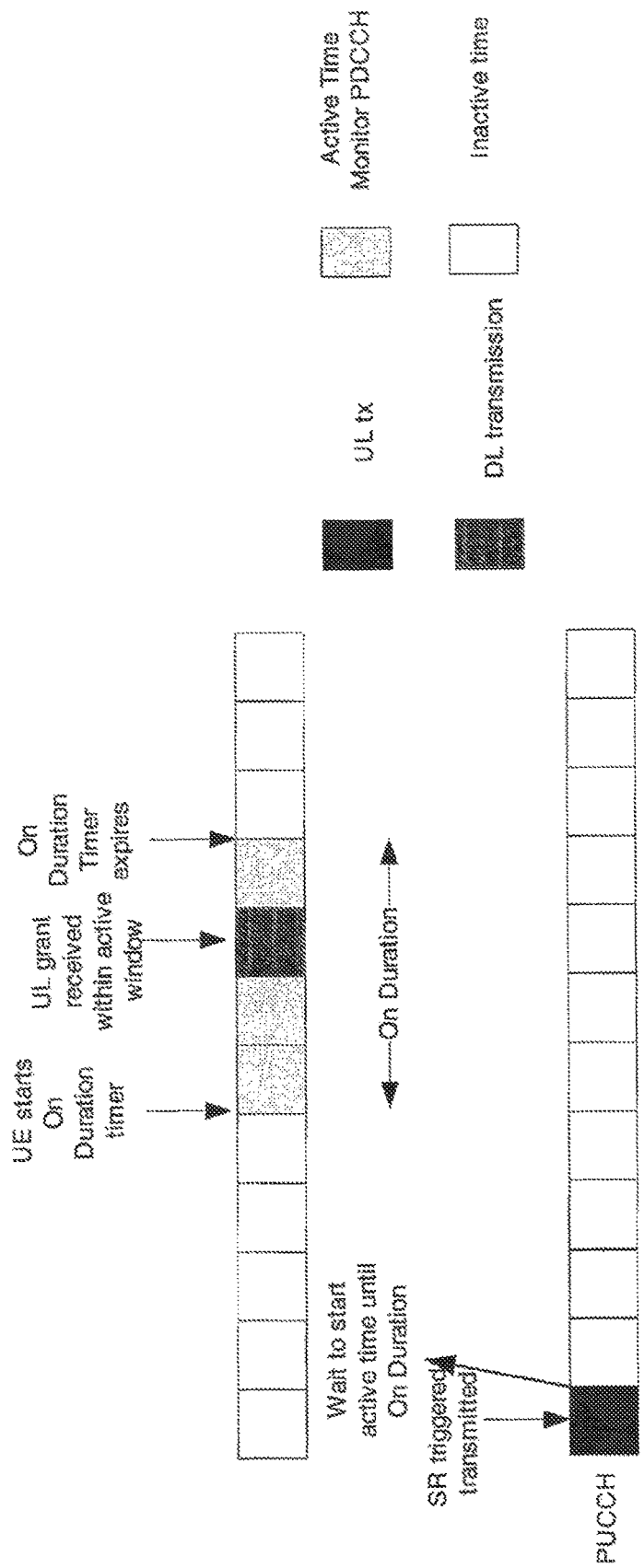
FIG. 8 shows an example behavior once SR has been transmitted.

Once the SR may be transmitted, the wireless device may continue to stay inactive, (if it was inactive), until the WTRU is in active time or until the LTE Scheduled period starts. The eNB is also aware that the WTRUs in in-device coexistence mode may not be monitoring the PDCCH after the transmission of SR until the LTE scheduled and/or on duration is active. FIG. 8 shows an example of such a behavior.

Alternatively, the wireless device may move to active mode (e.g. at 312), the ISM device may continue UL transmission, but the eNB may ensure that no collisions occur by scheduling the wireless device during the LTE Scheduled or On Duration periods (e.g. transmits the PDCCH). The same rule may also apply for a pending SR once the sr-prohibit timer expires.

If the wireless device may not initiate a SR or RACH according to the procedures described herein, some rules may be configured or predefined in the wireless device for which type of data transmission the wireless device may wake during an inactive period or unscheduled subframe to transmit a SR or a RACH preamble. More specifically, the network may configure the WTRU to wake up for sending data only for one or a combination of the following: a particular Logical Channel priority; a list of Logical Channel priorities; a minimum Logical Channel priority, i.e. if the Logical Channel priority for which the wireless device has data to transmit is above this minimum, the WTRU is allowed to wake up; a particular Logical Channel Group; a Logical Channel Identity; a list of Logical Channel Identities; and a NAS service request for a particular access class. In the later case, if the access class belongs to a high priority access class, such as an emergency call, the wireless device may wake up and trigger an SR regardless of the ICO rules. These types of traffic supersede the potential of generating interference to the other technology. Furthermore, the ISM transmissions may be suspended if the transmission may interfere with DL LTE reception.

A Random Access Procedure may also be used as described herein to enable co-existence of RATs. For example, if a random access procedure may be triggered, the wireless device may transmit a preamble during the random access resource frames and sub-frames allowed by the configured prachConfigIndex. Once the preamble may be transmitted, the wireless device may be required to be in active time and monitor the PDCCH for the following scenarios: 1) Random Access Response Window, (which starts 3 sub-frames after RA preamble has been sent), or until the wireless device receives DL assignment with RA-radio network temporary identifier (RNTI); and 2) after the transmission of Msg3 while Contention Resolution Timer is running, an UL grant is received, or contention resolution message is received.

If UL transmission causes interference to the other technology and if the configured physical RACH (PRACH) resource or if the Msg3 grant time corresponds to wireless device's inactive or LTE unscheduled time, one or more of the following may be performed.

The preamble may be delayed until the next PRACH resource that may overlap with wireless device's active time or LTE Scheduled period. The eNB may ensure that Msg3 grant is provided according to the LTE scheduled or active period.

Additionally, upon transmission opportunity of the preamble or msg3, the wireless device may notify the other technology regarding the upcoming transmission and the wireless device may transmit the data regardless of whether it overlaps with the active or scheduled periods.

For the downlink reception of the RAR and of Msg4, the wireless device may perform the one or more of the following (e.g. at 312). The wireless device may monitor the PDCCH if the random access window falls under the wireless device's active or scheduled period. The wireless device may stop monitoring the PDCCH at the end of the RAR window or scheduled (active) period (or if a RAR may be received).

Additionally, the wireless device may monitor the PDCCH only if the contention resolution time falls under the WTRU s active or scheduled periods. The WTRU may stop monitoring the PDCCH at the end of the contention resolution timer or scheduled (active) period (or if a msg4 may be received).

If the RAR window falls within the inactive or unscheduled time, the RAR window may be modified such that it is started the earliest opportunities where the RAR window starts according to RA procedure rules and scheduled/active time. In order for the eNB to know that the wireless device may be capable of receiving during scheduled time and that the RAR window may be moved, the source eNB has to provide the in-device information and pattern at the time of handover preparation. This solution works well if a dedicated preamble may have been allocated to the WTRU and the eNB knows that this WTRU is in an in-device interference mode of operation.

DRX operation with a guaranteed inactive time may also be used as described herein to enable co-existence of RATs. For example, one way to achieve DRX with a guaranteed inactive time may be to have, in addition to, DRX configured with On Duration and cycle, a maximum scheduled and unscheduled period configuration. In one example embodiment, the duration of scheduled or unscheduled time may be larger than the On Duration period, during which the wireless device may still be allowed to perform the usual DRX procedures, i.e. monitor PDCCH discontinuously and continuously according to the different DRX timers and triggers. As shown in FIGS. 9-12, the durations of scheduled and unscheduled periods may vary and may be dependent on the scenario and co-existing technology requirements.

However, once the maximum scheduled duration may be over, (e.g. during unscheduled time), the wireless device may stop monitoring the DL and provide the ISM the opportunity to transmit. Alternatively, during the unscheduled periods, the wireless device may still wake up during the On Duration periods but may not be allowed to extend the Active Time beyond the On Duration period and may implement any of the above described procedures for the different triggers during the LTE unscheduled period. Alternatively, the wireless device may still monitor the PDCCH during the LTE unscheduled periods according to the DRX rules, but if anything is detected in the PDCCH that requires UL transmissions, (e.g. UL feedback or UL data), in the subframe corresponding to LTE unscheduled period, the wireless device may not transmit and ignore the PDCCH. If DL transmissions are scheduled on the PDCCH, the WTRU may receive the DL data even though there is a risk of interference from the ISM and a risk of incorrectly receiving the data.

In an embodiment, such a solution may allow the network to still configure the WTRU with short On Duration periods to optimize battery saving (which may be received, e.g. at 310), but still provides enough flexibility and opportunity to schedule DL data that extends past the On Duration period.

Figure 9:
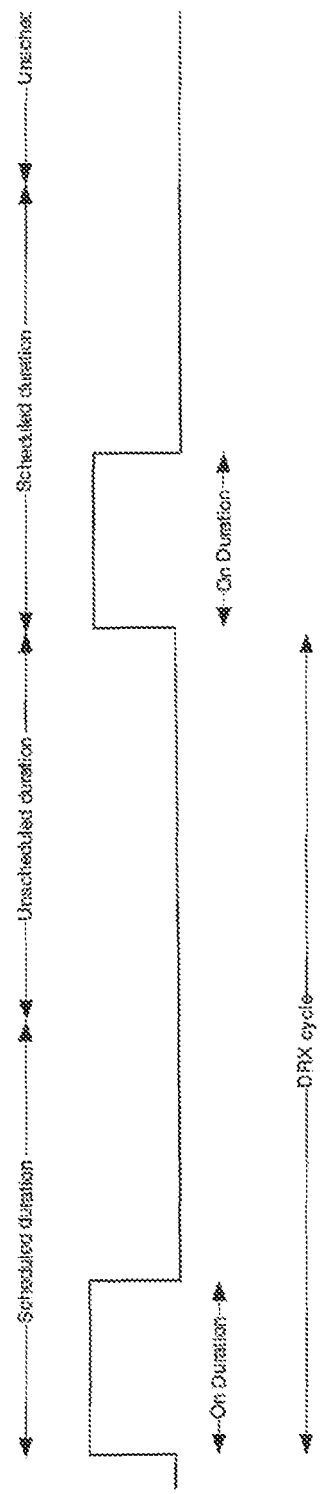
FIG. 9 shows an example discontinuous reception (DRX) operation.

FIG. 9 shows an example case where the Scheduled period may be larger than the On Duration period but smaller than the DRX cycle and where On Duration periods only occur during Scheduled periods.

Figure 10:
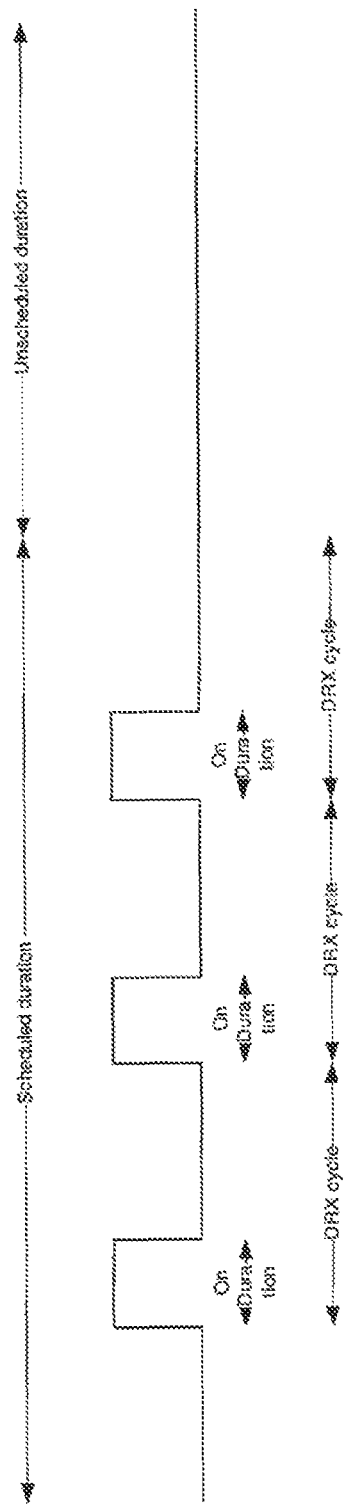
FIG. 10 shows another example DRX operation.

FIG. 10 shows an example case where the Scheduled Duration and Unscheduled Duration are larger than the DRX cycle and where the wireless device may not monitor PDCCH during the unscheduled periods.

Figure 11:
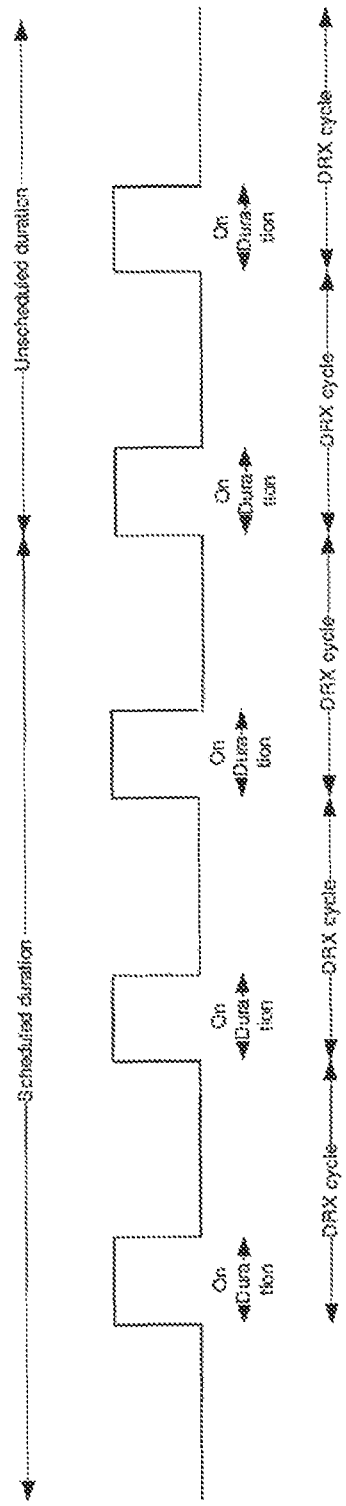
FIG. 11 shows another example DRX operation.

FIG. 11 shows an example case where the Scheduled Duration and Unscheduled Duration are larger than the DRX cycle and where the wireless device may monitor PDCCH during the On Duration periods occurring during the unscheduled periods.

Figure 12:
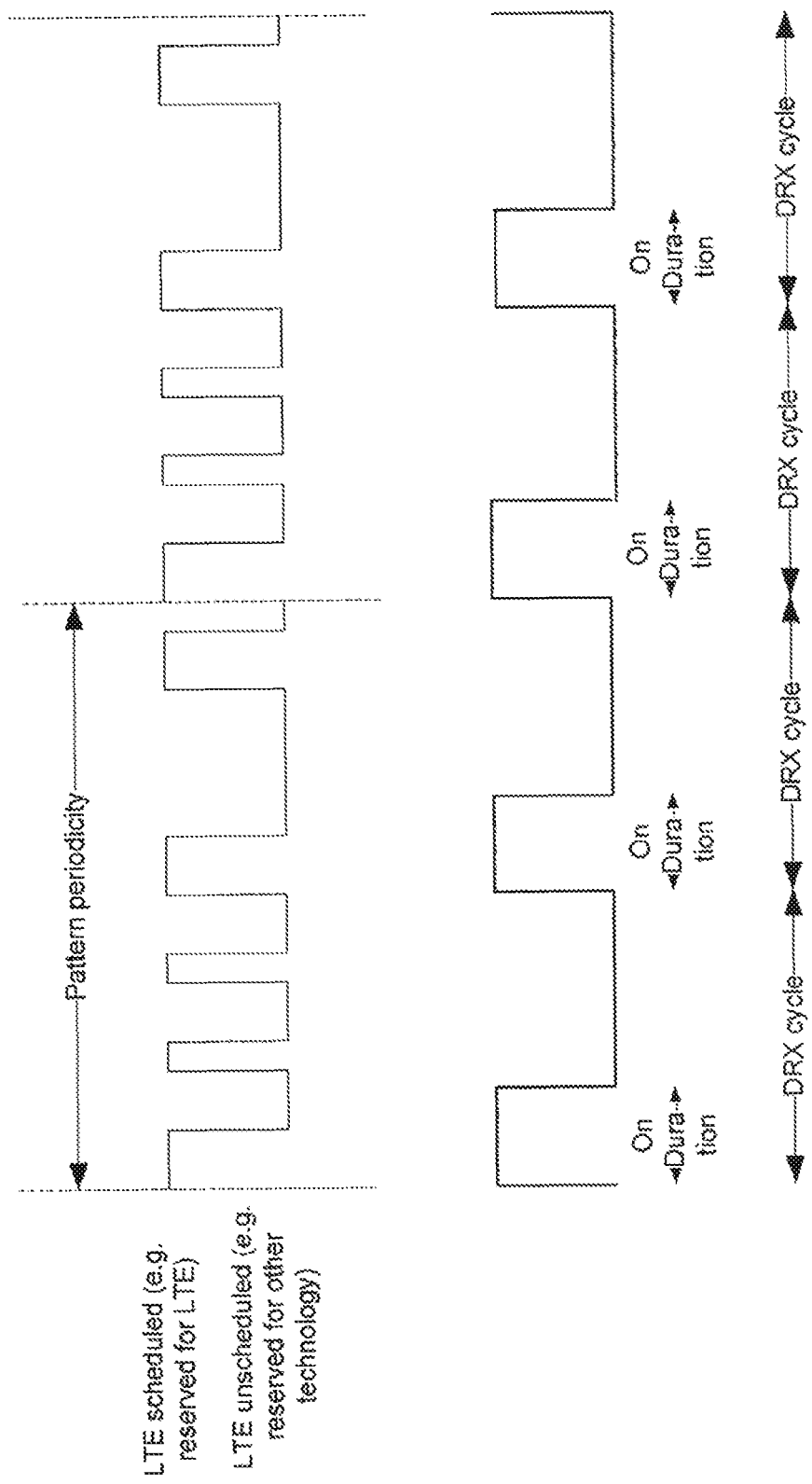
FIG. 12 shows another example DRX operation.

Additionally, FIG. 12 shows the example case where the scheduled and unscheduled duration vary within a DRX cycle. In FIG. 12, the DRX cycle may be smaller than the periodicity of the configured pattern, however, in another example, the DRX cycle may be larger.

The LTE Scheduled period when referred herein may be defined as the time in which LTE may transmit/receive data without being interfered. In LTE unscheduled periods, the subframes or TTIs may be reserved or configured in advance to be used by the other technology. During these subframes, any DL transmission over LTE may not be correctly received and any UL transmission may interfere with reception over the other technology (given the fact that the scheduler of the other technology assumes that those subframes are reserved for the other technology). As described above, a LTE scheduled/unscheduled pattern may include a Scheduled Duration timer and a cycle. When Scheduled Duration Timer may be running, the wireless device may follow the usual DRX procedures and monitor discontinuously PDCCH. Once Scheduled Duration Timer expires, the wireless device may stop monitoring PDCCH and go to sleep (e.g. at 312). Alternatively when the Scheduled Duration Timer may not be running, the but On Duration Timer may be running, the wireless device may monitor the PDCCH. Even though this may be described in terms of a timer, the LTE scheduled/unscheduled pattern may take a more explicit form, in which case no timers may be defined.

According to one embodiment, another timer, called for example Unscheduled Duration timer, may be defined in order to configure the period of inactivity of LTE. Alternatively, no timer may be defined for LTE unscheduled, and LTE unscheduled is defined as the period in which LTE scheduled timer is not running or the TTIs which are reserved for the other technology.

The value of Scheduled Duration and Unscheduled Duration may be configured by the network. Alternatively, the wireless device LTE may indicate or suggest values to the network after coordination with ISM and other technology. Alternatively, the wireless device may be a multiple of On Duration- and it may correspond to a value that is larger to On Duration and shorter than the DRX cycle. Alternatively, the LTE scheduled/unscheduled cycle may correspond to the same cycle as DRX, as a cycle configured independently of DRX, or as a multiple of DRX cycles. Additionally, the subframe offset to determine the time in which the LTE scheduled/unscheduled periods begin, may be the same as DRX, a new subframe offset predefined and/or configured by the network independently of DRX. The embodiments described herein may also be applicable independently of DRX.

In one embodiment, the scheduled/unscheduled pattern described herein may be used when the wireless device is configured in in-device coexistence interferences avoidance mode. For example, in one solution during the unscheduled period, (for example when Scheduled Duration Timer is not running or during the subframes used for ISM scheduling), there may not be any Active Time for DRX or no active time if no DRX may be configured, (e.g. during LTE unscheduled wireless device may be inactive or in idle time). In another solution, during the unscheduled period the wireless device may be allowed to be active during the onDuration, however the additional triggers to allow the wireless device to move to active time may not be applicable.

In another example embodiment, where a scheduled duration timer may be maintained, the wireless device may start or restart the Scheduled Duration Timer under one or more of the following conditions.

The network may indicate to the wireless device that the wireless device may have to start working in in-device interference avoidance mode. This may be achieved by implementing a new MAC CE (Control Element) command, for instance called an ICO MAC CE or RRC signaling.

The wireless device LTE may also detect it has to coexist with an ISM technology, where 1) wireless device LTE may detect the ISM technology is activated and/or 2) the ISM technology may coordinate with LTE so that LTE knows the ISM technology may soon start operating.

The wireless device may determine that according to the cycle and subframe offset the LTE scheduled timer may be started.

Additionally, the Unscheduled Duration Timer may expire if a timer may maintained. For example, when the Scheduled Duration Timer may be started/restarted, the Unscheduled Duration Timer may be stopped if running.

The wireless device may stop the Scheduled Duration Timer under the following conditions. For example, the wireless device may stop the Scheduled Duration Timer, if the network may indicate to the WTRU that it may stop working in in-device interference avoidance mode. This may be achieved by implementing a new MAC CE (Control Element) command.

Additionally, the wireless device may stop the Scheduled Duration Timer when the wireless device LTE may detect it may stop coexisting with an ISM technology (or other RAT technology) (e.g. when 1) wireless device LTE may detect the ISM technology is off or 2) ISM technology may coordinate with LTE such that that LTE knows the ISM technology stops to operate). The above concepts are equally applicable for a pattern that is provided to the wireless device in a more explicit form, (e.g. in form of a bit map, containing different scheduled/unscheduled subframes within a cycle).

In example embodiments, when the Scheduled Duration Timer may expire or when the wireless device may enter a LTE unscheduled subframe according to explicit pattern, the wireless device MAC may perform one or a combination of the following: stop monitoring PDCCH; alternatively only stop monitoring PDCCH if the On Duration Timer may not be running; stop the On Duration timer if running; stop DRX Inactivity Timer if running; stop DRX Retransmission timer if running.

The wireless device MAC may further stop the HARQ RTT timer if running. Alternatively, the HARQ RTT timer continues to run. If at the expiration of the HARQ RTT timer the wireless device determines that it may be in LTE scheduled period, (or determines that Scheduled Duration is on), the wireless device may choose to start the DRX retransmission timer, otherwise the DRX retransmission timer is not started.

The wireless device MAC may further stop using the DRX cycle(s) and/or cancel all pending SRs (Scheduling Requests) and let upper layer know SRs have been cancelled. Alternatively, the SR may be transmitted if the problem may be only in the DL but the PDCCH is not monitored until LTE scheduled period and/or OnDuration.

In another embodiment, the wireless device MAC may interrupt the Random Access Procedure if ongoing and let the upper layer know a Random Access procedure has been interrupted; interrupt the Random Access Response Window if active; and/or stop MAC Contention Resolution Timer if running and let the upper layer know a Random Access procedure may have been interrupted.

Additionally, the wireless device MAC may further indicate to the upper layer that the Scheduled Duration Timer may have been stopped such that that the upper layer knows it cannot trigger UL transmission; indicate the upper layer the time when Scheduled Duration Timer may be restarted; flush the HARQ buffer; start the Unscheduled Duration Timer if a timer is maintained; stop sending any HARQ feedback (ACK/NACK); and/or stop sending any retransmission.

In one embodiment, when the Scheduled Duration Timer may be started or when a LTE scheduled TTI may be ongoing, the wireless device may start using DRX as if it had received a DRX MAC CE command or resume the last DRX cycle. The wireless device MAC may indicate to the upper layer that the Scheduled Duration Timer may be running such that the upper layer knows it may trigger UL data transmission. The wireless device MAC may also include the number of sub-frames during which the Scheduling Duration Timer may be active, i.e. number of sub-frames before the timer expires.

Once scheduled duration may start again, the DRX retransmission timer may be started using the last value before it was stopped. Alternatively, the timer may be reset when stopped and restarted at the beginning of LTE scheduled. Alternatively, the DRX retransmission timer may not be started again when LTE scheduled duration is on.

In another embodiment, once scheduled duration starts again, the inactivity timer may be started using the last value before it was stopped. Alternatively, the timer may be reset when stopped and restarted at the beginning of a LTE scheduled duration. Alternatively, the inactivity timer may not be started again when the LTE scheduled duration may be on.

Other DRX operations may also be used as described herein to enable co-existence of RATs. For example, in another embodiment, the DRX rules and monitoring criteria in the wireless device may remain unmodified. The wireless device may then wake up according to the active time rules to monitor the PDCCH regardless of whether the other technology may be transmitting or not, (e.g. regardless of the LTE scheduled/unscheduled pattern). Such an embodiment may also be applicable if the wireless device may not be configured with DRX.

The burden to coordinate and ensure that no interference and collision may occur may be moved to the eNB side in an embodiment. More specifically, the wireless device may be provided with DRX parameters (e.g. at 310) and in addition, with a LTE scheduled/unscheduled pattern. The cycles of these patterns may be aligned with DRX cycles or alternatively a new cycle and offset may be provided to the wireless device or may be a function of DRX cycles. The pattern described herein, may be provided to the other technology which may be in turn relayed to its own network for coordination. The device, based on the pattern, may then determine the times in which it may transmit or receive based on the configured LTE unscheduled period (or subframes), cycle and offset. During the LTE scheduled period, the network schedules the wireless device in both UL and DL freely.

The eNB which may provide this pattern to the wireless device according to any of the embodiments described herein may not schedule the wireless device during the LTE unscheduled periods. However, the eNB may still schedule the wireless device under the knowledge that the transmission may be interfered on the wireless device side. This implies that the wireless device may still monitor the PDCCH during LTE unscheduled periods according to either DRX rules or continuously if no DRX may be configured.

If the network chooses to transmit during this period, to increase the reliability of the transmission during this period of time, the eNB may change the MCS, RV, power, and the like. The choice on how to modify the transmission may be based on CQI reporting. For example, to have an accurate view of the channel condition in the wireless device, the wireless device may report CQI during LTE scheduled periods, to indicate channel conditions in non-interfered periods and during LTE unscheduled periods. The wireless device may trigger a CQI every n subframes after the initiation of the scheduled/or unscheduled periods, or alternatively, a periodic CQI may be triggered. The periodic CQI may carry CQI during the wireless device's scheduled period and an aperiodic CQI may carry the CQI measured during unscheduled period. The CQI reported during the unscheduled period may also be provided periodically or only upon specific request by the eNB.

In such schemes, if the UL LTE may be the direction that may be causing a problem with a technology, for an example GPS, the wireless device may be allowed to only transmit PUCCH during the LTE scheduled periods. Given the characteristics of PUCCH, the interference created to the other technology may not be significant. Therefore, the network may schedule DL transmissions continuously, and the wireless device may provide PUCCH feedback during LTE unscheduled and during LTE Scheduled the wireless device may continue to provide PUCCH feedback and the network may also schedule UL transmissions on the PUSCH. During the unscheduled periods the wireless device may not be allowed to transmit UL data on the PUSCH or PUCCH. More specifically, even if the network schedules DL transmission and the corresponding ACK/NACK feedback falls under unscheduled period, the WTRU may not send the PUCCH ACK/NACK. Furthermore, the same may be applicable for UL PUSCH transmissions. If an SR may be triggered during the unscheduled periods, (TTIs or subframes), the wireless device may not transmit the SR until the next available PUCCH resource and next available allowed subframe (e.g. scheduled period). The same may be applicable to RACH transmissions. Additionally, the UE behavior during unscheduled period may follow any of the embodiments described above used individually or in any combination.

Dynamic dual DRX schemes may also be used as described herein to enable co-existence of RATs. For example, in one embodiment, to allow enough opportunities for either one of the technologies to transmit or receive data, a dynamic dual DRX scheme or a dual scheduled/unscheduled scheme may be used. More specifically, the wireless device may be configured with two DRX timers or two scheduled/unscheduled timers. The cycle may be the same but the durations like the OnDuration (inactivity timers, retransmission timers) or ratio between scheduled/unscheduled may change. The wireless device may every cycle change or alternate the timers. Alternatively, two patterns within one full cycle are specified. The wireless device may start with pattern one that provides the on duration and off duration, then may move on to pattern two which may consist of a different on and off duration.

To avoid lack of synchronization between the wireless device and the network, a full main cycle, which may be the sum of the two cycles, may determine the system frame number (SFNs) in which the first pattern may be started. Within each main cycle, two cycles with different timers or two patterns may take place that are configured by the network. Alternatively, every N cycles the wireless device may use the second pattern to determine the active periods for M cycles and then go back to pattern 1.

Fast pattern switching and dynamic co-ordination may also be used as described herein to enable co-existence of RATs. For example, in such a set of solutions, methods to dynamically trigger and signal a change of pattern may be performed (e.g. at 312). More specifically, ways to enable the wireless device to adapt to a fast/dynamic changing traffic patterns and mode of operations may be employed and described below.

As previously discussed, the wireless device may be configured with a set of allowed patterns for the given technology within the same device. Or alternatively, a finite set of service or usage scenario patterns are defined from which the network and/or the wireless device may operate with.

Additionally, when the other technology may first be activated or when the wireless device may report to the network the co-existence of two interfering technologies or the detection of an in-device interference situation and optionally including the suggested pattern, the network may provide the wireless device with one pattern, (or alternatively with a set of allowed patterns and optionally an index to the one it may be currently using) (e.g. received at 310). The wireless device may start using the pattern upon reception of the configuration, or alternatively, an explicit indication is provided by the network to configure the WTRU to start using this pattern right away or to wait for an additional trigger to be met (e.g. at 312). This solution may be beneficial if the network configures the pattern but the other technology has not yet been activated.

In such embodiments, the wireless device may be allowed to dynamically report to the network the status of the interfering or interfered technology. More specifically, the wireless device may trigger an indication to the network when one or more of the following conditions may be met: the other technology has been activated and is ready for transmission or reception; the other technology has been deactivated; the other technology has entered sleep mode or power saving mode; the other technology has exited sleep mode or power saving mode; a current application or service has been deactivated or terminated; anew application or service has been initiated by the user; a new higher priority application or service has been started; a change of usage scenario has been detected; A change of traffic amount has been detected (e.g. example, if the amount of buffered data exceeds or become below a threshold, then a report may be triggered); and/or any of the conditions described throughout this document to trigger a report to the network indicating an interference situation.

Upon triggering of an indication, the wireless device may use a L2 signaling to indicate to the network the change in status. A MAC CE or a RRC message may be used, where it may signal one or more of the following: indicate the status of the other technology, active (non sleep mode) or deactivated (sleep mode); the type of other technology; an index to a service or usage scenario; an index to a suggested predefined pattern; and/or an index to a buffer status threshold or category. It may also be understood that this report may include additional information as described in previous embodiments.

Upon reception of this indication, the network may activate or deactivate the use of the configured pattern. The activation/deactivation orders may be performed via L2 or MAC CE signaling or L1 PDCCH signaling or RRC signaling. The message may include a simple activation/deactivation of the configured pattern, or a change of pattern by signaling an index or an explicit pattern to start using and optionally a time reference. It may also be understood that a time reference, may be included in all the solutions described in this document, such that both the WTRU and the network may be synchronized. This time reference may correspond to one or a combination of the following: SFN; Subframe offset; Cycle length if units of frames or subframes; Absolute time; Frame Index, wherein the pattern is started at every the frames for which the following is true SFN mod cycle length=frame index. A subframe offset may also be provided.

With the use of the dynamic method described herein, the network does not have to remove the configuration in the wireless device, but it may dynamically control when the pattern may be activated or deactivated. Alternatively, the network may change the pattern that may be used by the network by signaling the new pattern and an activation time or time reference of the pattern.

In one example, if the RAT device may be a WiFi device or any device that enters sleep mode, the WTRU may indicate this to the network, and the network may either deactivate the use of patterns or alternatively provide a pattern that allows the wireless device to operate in sleep mode, for beacon reception or to allow the station to poll for data, which may be received at 310 and processed at 312. When the wireless device wakes up, the wireless device may notify the network and the network may indicate to the wireless device to start using another pattern that provides more transmission opportunities for the other technology.

In another embodiment, the wireless device may dynamically request short burst of free time in LTE to allow transmission of data in the other technology. For example, in the scenario where the other technology is in sleep mode and it determines that the AP has buffered data for this wireless device, the wireless device may request LTE to not transmit for x TTI to ensure it may receive the buffered data. This may be achieved, by transmitting an indication to the network requesting x TTIs of no UL scheduling or that the LTE WTRU may not be transmitting during those periods. Once the x TTIs are over, the network may start scheduling the device in the UL. The same may be applicable for the DL. If the other device determines that it has to transmit data, the wireless device may signal the network to not schedule the WTRU for X TTIs. The number of TTIs may be included as part of the indication. This request may be performed by using MAC CE or by higher layer signalling. The number of unscheduled TTIs the wireless device requests using a MAC CE may be dynamic, up to a maximum value, or a fixed number. The request for a short period of unscheduled time may also be part of a set of predetermined or configured patterns, for which the wireless device may refer to by means of an index.

In technologies where the user polls the access point or the network side for information, the access point may be provided with an allowed transmission pattern, such that if data has to be transmitted to the station as a result of the poll, the access point transmits during the allowed opportunities thus reducing the possibility of losing data. Additionally, it may be understood that the patterns and the dynamic control of these patterns refers to any ICO specific patterns, such as scheduled/unscheduled periods/subframes, DRX/DTX patterns, semi-persistent scheduling pattern, or the like.

In such a fast pattern switching scheme, the ISM in the WTRU may immediately start to transmit ISM traffic upon determining that certain ISM traffic has been triggered. This may trigger LTE to send a request. Alternatively, this indication may be sent in a proactive way, (e.g. before interference is generated), as discussed in the previous embodiments. If the WTRU has a UL grant it may signal to the network the short unscheduled TTI request using the MAC CE in the first identified opportunity. Alternatively, a request for resource may also be sent using a SR in the PUCCH.

Alternatively, if the wireless device does not have a grant, no message may be transmitted to the network (e.g. at 308). However upon reception of the first UL grant, the wireless device may use this grant to send the short unscheduled TTI report to the network, if ISM transmission/reception may be still ongoing.

Alternatively, LTE in the wireless device may signal the pattern to the network before ISM (or other RAT) has even started to transmit. The network may either grant the request to the wireless device by acknowledging the request or providing a response indicating the exact amount of TTIs the WTRU may be unscheduled as a result of this trigger. Once the wireless device may have received the acknowledgment or a pattern, ISM may start its transmission in the granted subframes or according to the pattern.

Example embodiments to allow TDM operations useful for enabling co-existence of RATs may also be used (individually or in combination) as described herein. More specifically, the independent methods of allowing for TDM operation may all be used in combination to allow a device to meet its service requirements for different usage scenarios. In one example, this may be achieved by the wireless device requesting or suggesting a pattern of specific LTE scheduled and/or LTE unscheduled subframes in the notification report. As previously described, a LTE scheduled subframe may refer to a subframe used or reserved for LTE scheduling and a LTE unscheduled subframe may refer to a subframe to be used for scheduling the other technology.

The pattern may take one or a combination of the following forms: a bitmap with a given periodicity or cycle, a cycle and/or a subframe offset, where the bitmap may include specific suggested subframes which should be reserved for one technology (e.g. LTE) or should be used by the LTE technology, or subframes in which an interference situation occurs or doesn't occur (e.g. if the pattern is known in advance); a number of consecutive LTE scheduled subframes (or alternatively unscheduled subframes) within a cycle, a cycle and/or a subframe offset; a time duration of LTE scheduled subframes within a cycle, a cycle and/or a subframe offset; and/or a number of TTIs for one time short unscheduled request by the wireless (e.g. if the wireless may be requesting the network to not schedule the wireless device for a number of consecutive TTIs). This may be indicated by means of a separate request, or by means of the same request as above but the cycle value is set to infinity or to a special value).

In another example, an index to a predefined set of patterns may be signaled to the network and a subframe offset is signaled. The set of predefined patterns may include all possible patterns as described above, such as at least one bitmap including the scheduled/unscheduled pattern within the bitmap. The patterns may also include at least one bitmap including consecutive scheduled subframes and consecutive unscheduled subframes. The periodicity of these patterns may be longer and therefore to save space, the pattern may include the number of consecutive scheduled subframes within a cycle. The remaining subframes within the cycle are considered to be unscheduled subframes. The patterns may also include at least one entry that includes number of one time unscheduled subframes that the wireless device may be requesting for one time operations.

In response to the requested pattern, the wireless device may receive a configuration containing the same pattern, a new pattern, or just an indication, (e.g. one bit), indicating to the WTRU that it may use the requested pattern.

The wireless device may start applying the configured pattern (e.g. at 312) according to the bitmap, periodicity (or cycle) and timing offset. During LTE scheduled subframes, the wireless device may operate according to legacy LTE procedures. During LTE unscheduled subframes, the wireless device may perform one or a combination of the following. The WTRU may not monitor the PDCCH. Alternatively, the PDCCH is still monitored according to the DRX procedures. If a PDCCH schedules DL data, the wireless device may not decode the PDSCH. Alternatively the PDSCH is still decoded. If the ACK/NACK feedback timing overlaps with an unscheduled subframe the WTRU may not transmit PUCCH. If a PDCCH schedules UL data, the wireless device may not perform the UL PUSCH transmission if it corresponds to a configured unscheduled subframe.

The wireless device may also not perform any UL transmissions. For example, if a UL retransmission, (e.g. non-adaptive), corresponds to a unscheduled subframe, the WTRU may keep the data in the HARQ buffer. At every HARQ RTT the retransmission counter may be increased each time the wireless device cannot transmit the data due to a unscheduled subframe.

If a SR may triggered, the wireless device may not perform and a PUCCH transmission may not get sent until the next available scheduled subframe with a PUCCH resource. Additionally, if a SRS may be triggered, the wireless device may wait for the next triggering or may send the SRS in the next available scheduled subframe.

If a RACH preamble needs to be transmitted, the wireless device may wait for the next available scheduled subframe and allowed RACH subframe according to the RACH configuration index.

If a periodic CSI may be triggered, the wireless device may not transmit the CSI. Additionally, if an aperiodic request may be received by the wireless device and the UL CSI report time transmission corresponds to an unscheduled subframe, the wireless device may not transmit the CSI report.

In yet another embodiment, methods to reduce interfere in the UL may be performed to enable co-existence of RATs as described herein. For example, the LTE and the victim technology may co-exist together, via time multiplexing methods. More specifically, the interference to the victim technology may be minimized or controlled by means of UL DTX in the WTRU, or reduced uplink transmission mode.

As part of this method, a new UL transmission mode may be introduced that may minimize the interference to the co-existing technology receiver and simultaneously allow the wireless device to carry on its transmissions over LTE. It may be understood that similar methods may also be used for the other technology in order to avoid interfering with the LTE receiver.

Figure 13:
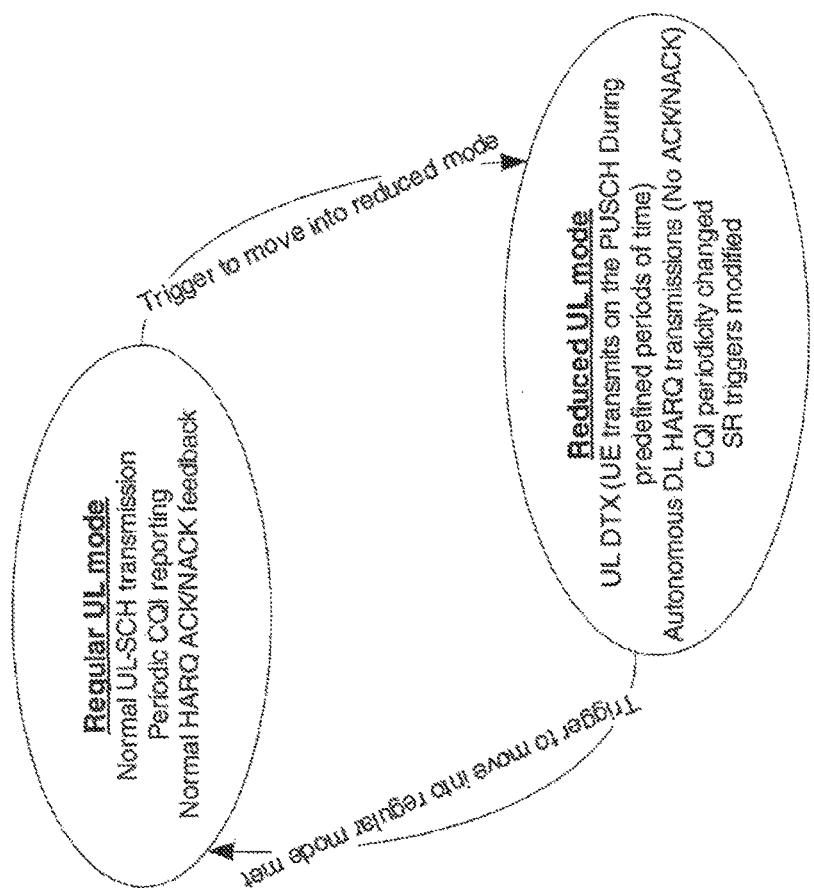
FIG. 13 shows an example reduced uplink mode operation.

Additionally, the UL LTE may operate in two states, regular UL mode and reduced UL mode as shown in FIG. 13. The regular UL mode or state, (hereafter used interchangeably), refers to a LTE UL performing normal/legacy UL and DL LTE reception procedures, such as but not limited to: regular PUCCH transmissions such as periodic CQI reporting, ACK/NACK reporting meeting normal latency requirements with respect to DL traffic, and normal scheduling requests; and PUSCH transmissions according to need of transmissions and scheduled resources by the network.

The wireless device may be in reduced UL mode when a co-existing technology's receiver may be active and the LTE UL transmissions may be causing interference to that receiver. The triggers to transition between the two modes of operation according to a number of triggers are described herein. A reduced UL mode of operation refers to a mode of operation where the wireless device may not be continuously transmitting. The modifications to UL transmissions include the PUSCH and PUCCH transmission patterns. Some procedures associated to this mode of operation are described below. An example of the operation may be shown and described in FIG. 13.

A reduced UL transmission mode may include a wireless device that may be performing UL transmissions only at specific times or SFN and/or subframes. The periods that the WTRU may perform UL burst transmissions may be determined according to a network configured pattern, where the network includes a cycle period and a burst period, (e.g. a number of consecutive TTIs the wireless device may be allowed to transmit in the UL), every DTX cycle. Alternatively, the UL transmissions pattern and times may be autonomously determined by the WTRU.

The patterns described herein may be used for either PUSCH transmissions or PUCCH transmissions.

For PUSCH transmissions, the wireless device may transmit uplink shared channel (UL-SCH) or PUSCH according to a predefined pattern, (referred hereafter as UL DTX pattern), or the period of times that the network has provided to the wireless device. This periodicity provided by the network may consist of one or a combination of the following. The periodicity may consist of DTX parameters that may include, cycle, burst period, and the like. During the burst periods the wireless device may be configured with a grant, (e.g., have allocated resources, MCS, TB information and the like) and therefore transmit the data according to this grant. This grant may be applicable for only one TTI at the SFN given according to the DTX cycle, or may be applicable for a number of subframes within the burst period. The grant may be given to the wireless device as part of the DTX parameters and it may be a grant the wireless device may use for the duration of the burst. If according to the BSR or power headroom report (PHR), the network determines that the wireless device may need more grant to empty the buffer, this grant may change. However, the next time the wireless device may wakes up, it may fall back to the original default grant. Alternatively, the wireless device does not necessarily have a grant. At the wake up periods according to the DTX parameters, the wireless device may send a SR on the PUCCH to request the correct amount of resources that may allow the WTRU to empty the buffer during the burst period.

In one embodiment, the network may provide the wireless device with a semi-persistent grant to be used for the duration of this mode of operation. When moved back to normal mode, the wireless device may cease using the semi-persistent grant. If the grant changes dynamically during a burst period, the wireless device may fall back to the original configured semi-persistent grant next time it wakes up.

Additionally, the wireless device may wake up every DTX cycle for x subframes or burst period, during which time it may transmit according to a semi persistent grant.

The semi-persistent grant or the DTX grant may be provided to the wireless device for a number of sub-frames within the wake up period. More specifically, when the wireless device wakes up at the SFN according to the DTX cycle, it may use the grant or the allocated resources in a number of subframes according to a predefined rule or during some configured sub-frames.

For both of the solutions described above, the semi-persistent grant and DTX cycle may be long enough such that for certain application the data may be transmitted in the UL while still meeting the QoS requirements. However, the wireless device may have a few logical channels configured with different requirements. To still minimize interference and allow timely transmission of data, a two tier DRX or semi-persistent grant may be allowed. For example, shorter DTX cycle or semi persistent grant cycle may be configured for delay sensitive or more urgent data, and a longer DTX cycle or semi-persistent grant cycle may be configured for the more delay tolerant logical channels that may require more bandwidth. Alternatively, if such logical channels receive data in their buffer, the wireless device may move back to regular transmission mode.

Alternatively, the wireless device may autonomously wake up between the DTX period if it determines that a high priority procedure needs to take place (e.g. at 312), such as an emergency call, or delivery of status reports. A long DTX cycle may delay the delivery of RLC status reports. In order to reduce the delay associated with the delivery of the report, the WTRU may perform UL transmission regardless of the DTX cycle. It may wake up to send an SR to receive a grant for transmission of this data.

In another embodiment, the timing of UL-SCH may be autonomously controlled by the wireless device. More specifically, an interaction between the LTE and the victim receiver may allow the wireless device to determine the best time to start UL transmissions. This determination may depend on the reception activity of the other technology, (e.g. if an idle period is detected the wireless device may start). It may depend on a maximum delay allowed by the LTE logical channel or application that is being transmitted in the UL. It may depend on a function of the two bullets above.

More specifically, if the wireless device may determine that it may transmit data, the wireless device may send an SR to indicate to the network that it wants to transmit. Given the fact that the wireless device may have limited time to transmit this data, to minimize the interference time, it may be beneficial if the network allocated more resources to this wireless device such that the wireless device may empty its buffer or transmit in the least amount of time. The network may be made aware of this situation, by means of knowing that the wireless device may be in the reduced UL mode, as described above. When an SR in this mode may be received, the network takes this into consideration when scheduling the wireless device. Alternatively, the wireless device may indicate the interference situation in the SR. More specifically, the SR may be modified to include a notification or a bit, that is set when the wireless device has determined that a receiver on another co-existing technology is being interfered from the UL. This may require modification to the format of the Scheduling Request or re-interpretation of bits.

During the DTX cycle or during the reduced UL mode, the wireless device may ignore the UL grants received. Alternatively, if a change of semi-persistent grant is detected in the PDCCH, the WTRU may change the grant value and only use at the wake up time.

For PUCCH transmissions, the LTE uplink transmissions may also include the PUCCH, including the ACK/NACK feedback for DL traffic, the Channel Quality Indication (CQI), and the scheduling request. In order to keep the interference to the co-existing technology to a minimum, the reduced UL state may also consist of a reduced PUCCH mode of operation. While the reduced PUCCH may enhance the performance, the wireless device may continue normal PUCCH transmission while reducing the time of UL transmissions.

To allow for the reduction PUCCH transmission, HARQ ACK/NACK feedback may not be provided while the WTRU is in the reduced UL mode. During this time the eNodeB may perform autonomous HARQ retransmissions, and the WTRU may decode the DL data and doesn't not send any HARQ ACK/NACK.

To further reduce the need to send the PUCCH, the number of CQI reports may be limited. More specifically, the CQI reporting periodicity may change to the periodicity of the UL DTX pattern or to that of the semi-persistent grant. If as part of the DTX pattern, the burst transmission lasts a few TTI, the wireless device may send CQI reports more often.

Lastly, the scheduling requests may be limited to be triggered according to one of the DTX patterns. However, if some triggers are met and the SR needs to be transmitted as described above, the WTRU may still transmit the PUCCH.

Alternatively, once a SR may be triggered, the wireless device may wait for either a timer expiring, (e.g., a max time the WTRU may keep the SR), and the wake up period.

Additionally, in another embodiment, the PUCCH may still be transmitted according to regular mode triggers. However, to reduce the potential interference it may cause, the PUCCH may be transmitted on one frequency only. Currently, the PUCCH may be transmitted using frequency hopping according to an index provided by the network.

The PUCCH may be a narrow band signal (1 RB), mainly transmitted on the edge of the UL bandwidth over two frequencies. Therefore, to reduce the interference if the frequencies correspond to one of the frequencies that cause interference, the WTRU does not perform frequency hoping to that frequency. Then the second slot of the PUCCH may be transmitted on the same non-interfering edge at the next occasion. This may be achieved by one or a combination of the following. The network may give the WTRU only one frequency allocation over which it transmits the PUCCH.

Additionally, the wireless device may autonomously stop doing frequency hopping on the two frequencies indicated by the network and only transmit on the frequency that may not cause interference. The network may know this implicit behavior may take place upon state transmission. Alternatively, the network may configure the wireless device with two noninterfering frequencies to transmit the PUCCH.

In an example embodiment, the wireless device may be allowed to send its PUCCH on a single non-interfering region. However, to avoid collisions and interferences with other wireless devices using the same resources, the network may use code division multiplexing for these wireless device. The information required for the wireless device may be provided explicitly by the network. The SRS transmission may also be transmitted in the same narrow band region.

The wireless device may autonomously not transmit the SRS to the network if it detects it is in an unscheduled period of the DRX pattern and wait for the scheduled period to resume its periodic SRS reporting. Alternatively, this may be configurable by the network, i.e., the network may indicate to the wireless device if it is allowed to not report SRS during unscheduled periods. Alternatively, the wireless device autonomously or the network by configuration, may decrease the periodicity of the SRS reporting during the unscheduled periods compared to the reporting during the scheduled periods. This may be useful in case of very long unscheduled periods.

To determine when to transition between the two modes of operations, the wireless device may use one or more of the following methods to trigger a transition between such modes. However, it may understood that the triggering criteria, even though described in the context of reduced UL DTX mode, may be used for a similar DL mode of operation, such as DRX.

For example, while the wireless device may be operating in regular UL mode, when a victim receiver may be enabled or starts DL reception and the wireless device may determine that the UL LTE is or may be interfering with the other technology's receiver, the WTRU may perform one or a combination of the following. The wireless device may autonomously move to the reduced UL state. After moving to the reduced UL state, the wireless device may notify the network of the transitions in the UL mode of operation. Alternatively, the wireless device may not explicitly notify the network, but the network may autonomously determine that the wireless device is operating in a reduced UL mode based on wireless device behaviors. Alternatively, the wireless device transitions to the reduced UL state only upon an explicit configuration from the network. More specifically, the wireless device may notify the network that a victim receiver has or may be enabled using any of the procedures described above. The network may then explicitly signal to the wireless device to move to the reduced UL state and may also provide the new configuration parameters.

Once in reduced UL mode, the wireless device may transition back to regular mode according to one or a combination of the following triggers. The wireless device may transition back upon explicit indication by the network. Alternatively or additionally, the wireless device may transition back when the victim receiver or technology is disabled or has not been active for a period of time. If this condition is met, the wireless device may start regular mode transmission and then send a notification to the network. Alternatively, wireless device may send a notification to the network that the device is no longer active, according to the procedures described above and wait for an explicit indication.

Alternatively or additionally, the wireless device may transition back when an inter-frequency or inter-RAT handover may be performed to a frequency or RAT that no longer causes interference to the other technology's receiver. The wireless device may also transition back when a high priority service, logical channel, or high priority access class service, (such as an emergency call) is initiated.

Additional conditions that may be met by the wireless device prior to starting reduced UL mode transmissions may include the activity ongoing on the LTE technology side. More specifically, the priority of the logical channels that include data, or the QoS of those services. For instance, if delay sensitive applications are active, the WTRU may remain in regular UL mode. The wireless device may also provide this information to the network, (e.g. the buffer size of the logical channel), such that the network may properly schedule the DTX pattern. Additional conditions may also include the relative priority of the applications between LTE and the other technology. For instance, if the LTE application is considered to be higher priority, the LTE may remain in regular UL mode, otherwise, it may transmission to reduced UL mode.

The patterns described in these section, may be provided to the other technology in an effort to co-ordinate the times of transmission and reception. The other technology may also provide this information to its network, such that the other network, (e.g. the transmitting node), may be aware of the times it may not transmit.

Power Backoff or Scaling Schemes may also be used as described herein to enable coexistence of RATs in a wireless device. For example, alternative to time domain solutions where transmissions are coordinated between RATs to ensure or minimize transmissions occurring at the same time, transmissions may be scaled back on one or more RATs to reduce the level of interference without completely blocking transmissions at any one moment in time.

One such method may be for the wireless device to approximate the amount of power that may be applied to certain frequency bands that maintains interference to an alternate RAT to a known threshold. When transmissions are realized in common or overlapping frequency bands, the wireless device may determine the amount of power that may be applied on each RAT that minimizes or eliminates transmission failures on the alternate RAT. To accomplish this, the wireless device may incorporate an ICO function that distributes power between RATs in transmission time intervals where transmissions are occurring simultaneously.

When interference to an alternate RAT may be detected above a threshold, the wireless device may apply power backoff and scale transmission power on ongoing transmissions so that interference is maintained below the threshold. It is noted that power scaling may result in increasing the number of HARQ retransmissions and the residual HARQ error rate.

In one embodiment, wireless device power scaling may result in failed transmissions. As such, it may be important that UL grants be adjusted to the reduced available WTRU transmission power. To reduce the size of UL grants, the UE may generate an explicit signal to the scheduler identifying the power backoff or scaling condition and potentially the level of power reduction on particular bands.

One method in LTE that may be applied to identify the power scaling event may be to utilize the existing MAC CE Power Headroom report (PHR). In LTE R10 the cause of power backoff due to MPR or P-MPR is identified in the PHR (i.e. which factor dominates the calculation of Pcmax,c). An additional field or code point in the MAC PHR CE may be specified which indicates power backoff or scaling due to in-device interference. In LTE Release 10 (R10), for each activated SCell the PHR includes the power headroom (PH) and implementation specific power reduction required power reduction due to grants on other cells (Pcamx,c). The specific amount of power backoff or scaling needed to minimize interference to other RATs for each band or component carrier may be added as an additional parameter to signaled PH and Pcmax,c or used as an additional factor in calculating Pcmax,c for each activated SCell.

Additionally, the amount of additional power backoff or scaling needed to minimize interference to other RATs may also be added to other power backoff or scaling factors for the frequency band or component carrier. If the actual backoff or scaling factor may be signaled, the wireless device may or may not identify the sources causing the power scaling. Identifying the particular sources may be useful for the scheduler to predict potential power backoff or scaling in subsequent transmission time intervals. Therefore, if the additional power backoff is added to existing backoff or scaling factors, it may still be useful to include an indication of the cause for the reported power backoff.

In LTE Release 10 (R10), the wireless device may be permitted to reduce its maximum output power to avoid exceeding out of band emission limits as a function of the signals being transmitted. The wireless device, based on its implementation, may use the full allowed power reduction, or a lesser value. In each subframe, i, for a given component carrier (CC), the wireless device may determine its required power reduction based on LTE configuration and grants. This may be called $MPR_{actual,c}(i)$ and the maximum allowed output power in that subframe becomes:

$$P_{CMAX,c}(i) = MIN\{P_{EMAX,c}, P_{PowerClass} - MPR_{actual,c}(i) - \Delta T_{C,c}\} \quad \text{(Equation 1)}$$

where $P_{EMAX,c}$ may be the maximum power signaled by higher layers (for the CC).

$P_{PowerClass}$ may be the maximum WTRU output power for the WTRU's class.

$MPR_{actual,c}$ may be the actual power reduction the WTRU took due to maximum power reduction (MPR)/additional MPR (A-MPR) effects (for the CC).

$\Delta T_{C,c}$ may be a fixed power offset that is a function of the transmission bandwidth (BW) (for the CC).

Additionally LTE Release 10 (R10), the wireless device may be permitted to reduce its maximum output power for power management due to power requirements unknown to the LTE scheduler. In each subframe, i, for a given component carrier (CC), the wireless device may determine its required power reduction based on LTE configuration and grants. This may be called P-$MPR_{actual,c}(i)$ and the maximum allowed output power in that subframe becomes:

$$P_{CMAX,c}(i) = MIN\{P_{EMAX,c}, P_{PowerClass} - MAX(MPR_{actual,c}(i), P\text{-}MPR_{actual,c}(i)) - \Delta T_{C,c}(i)\} \quad \text{(Equation 2)}$$

One possibility may be that power backoff due to minimizing interference to other RATs may be an additional term, for example, RATbackoff,c(i), and the maximum allowed output power becomes:

$$P_{CMAX,c}(i) = MIN\{P_{EMAX,c}, P_{PowerClass} - MPR_{actual,c}(i) - P\text{-}MPR_{actual,c} - RATbackoff, c(i) - \Delta T_{C,c}\} \quad \text{(Equation 3)}$$

More likely, however, the power backoff may be to minimize interference to other RATs and may not in addition to the MPR reduction, but rather in parallel with the MPR reduction so that in effect the larger of the 3 reductions may be used. In such a case, the maximum output power becomes:

$$P_{CMAX,c}(i) = MIN\{P_{EMAX,c}, P_{PowerClass} - MAX(MPR_{actual,c}, P\text{-}MPR_{actual,c}, RATbackoff, c(i)) - \Delta T_{C,c}\} \quad \text{(Equation 4)}$$

To provide timely PHR information to the eNB scheduler, various reporting triggers may be specified. Since it is difficult to predict interference affecting other RATs in advance, it may be necessary to provide a specific trigger to provide PHR quickly upon detection of interference affecting other RATs. Similar to P-MPR triggering in R10, one way to accomplish this may be to trigger PHR when RATbackoff,c(i) of a particular SCell changes more than a configured threshold. The configured backoff threshold among other factors may be dependent on deployment scenarios and implementation specific eNB scheduler design.

If the applied power backoff or interference to other RATs may be calculated in parallel to other backoff factors where the reduction in power may be determined by the MAX ($MPR_{actual,c}$, P-$MPR_{actual,c}(i)$,RATbackoff,c(i)), then there may be cases where even though the backoff due to RAT interference crossed the configured threshold there may be no effect on the actual power backoff if it is dominated by MPR/A-MPR effects or P-MPR effects. Therefore to minimize unnecessary reporting, PHR triggering due to change in RAT backoff may be limited to when this factor dominates the calculation of the applied backoff (Pcmax,c) for that cell.

According to an example embodiment, similar to power management in LTE R10 power backoff or scaling in the WTRU due to in-device interference and other causes may be applied in time domain windows rather on a transmission time interval basis. One reason for this is scheduling of UL grants may not be immediately adjusted. By applying power backoff or scaling over a period of time rather than for particular transmissions, UL grants matching the level of power backoff or scaling is increased. Additionally, identification of the power backoff or scaling event may be subject to a prohibit timer that delays the MAC CE PHR. In this case, application of power backoff or scaling may be delayed until the MAC CE PHR may be transmitted or is realized by the eNB scheduler. A similar method may be applied when power backoff or scaling may be removed. In this case, only when the reduced backoff or scaling is reported or realized by the scheduler, is the power backoff or scaling actually reduced. This solution may have the benefit as in power management of properly supporting LTE UL grants and minimizing interference to other RATs when transmissions on other RATs are quickly reactivated.

A power reduction value and reason may also be reported to be network via the notification message that may be triggered when the UE detects an in device interference situation and a power management procedure as described above may be performed.

Additional prevention mechanisms in idle mode may also be performed for example, in response to information associated with such mechanisms being received and processed by the wireless device (e.g. at 310 and 312).

If the wireless device may be in an idle state and no pending data may be in a buffer of the wireless device, the wireless device may restrict or co-ordinate the ISM device (or another component supporting a RAT) to protect the actual operation of the wireless device such that no data may be transmitted during the paging and measurements periods. This may be performed, for instance, when the co-existing technology may activated, (e.g. ISM or GPS may be activated), but the wireless device may already be connected to the LTE system.

Given that the wireless device may be idle, the time to change to another frequency may not be critical. The wireless device may remain in idle mode while a RAT technology such as the ISM technology may be activated. However, as part of this solution the wireless device may notify the network that the RAT such as the ISM technology has been activated. This may allow the wireless device to move out of the frequency ahead of time. In order to notify the network in idle mode, the wireless device may use the RRC connection request message. A one bit indication in the RRC connection request may be used to indicate to the network a co-existing technology, (that may generate in-device interference), within the device is requesting to be activated, or has been activated. Alternatively, a new establishment clause in the RRC Connection request may be introduced, (e.g. in-device technology active). The network may respond to the wireless device via a RRC rejection message with cause redirection.

Alternatively, the wireless device may notify the network that the RAT component or device such as the ISM device is active once an RRC connection establishment procedure is initiated. This notification may be present in the RRC connection request or in the RRC connection setup complete. The network may then chose to send the wireless device to connected mode (e.g. via information received at 310) and perform one of the actions described above (e.g. via processing at 312), or alternatively give the wireless device redirection information.

Together with the indication or report with the information discussed above, the wireless device may provide to the network a temporary pattern that the wireless device may be using to allow for proper reception of the RRC Connection setup message. Together with the pattern, the wireless device may specify a reference timing such that the network may be aware of the downlink sub-frames in which the ISM device is not transmitting and therefore the eNB may use for downlink transmission. The pattern used by the wireless device and signaled, may be an explicit pattern. Alternatively a default pattern pre-defined and known by both the wireless device and network may be used for the reception of the RRC connection setup message. When the network receives the indication in the RRC connection request it may use this default pattern to determine the sub-frames in which the RRC connection setup or the RACH msg4 is scheduled in the DL.

Alternatively, the WTRU may provide an index to a set of predefined patterns that it may be using temporarily until a new pattern or actions are requested by the network. On the wireless device side, the wireless device may use the signaled pattern to determine the sub-frames which it may monitor in the DL. For instance, while the macContention-Resolution timer is running, the wireless device my monitor the subframes in which the other device is not transmitting or the LTE scheduled periods according to the pattern. Alternatively, the wireless device may perform continuous reception and relies on the network to transmit the message on the right sub-frames. This may be beneficial given that the network may not support this feature and it may actually transmit the response on any of the sub-frames.

In an alternate solution that may also be used in combination with the above, it is proposed that when a RACH access preamble is transmitted, in order to ensure proper reception of the RAR, the wireless device may inform the other technology to not perform any UL transmissions for the duration of the random access response (RAR) window, (e.g. for the time the WTRU is expecting to receive a RAR). Additionally, the same may apply from the time message3 is transmitted and the MAC contention resolution timer has been initiated, until either the contention timer expires or msg4 may have been successfully received by the wireless device.

In another embodiment, the wireless device may reselect or get redirected to another frequency or RAT (e.g. at 312) to allow for independent full operation of an RAT component or device such as the ISM device within the wireless device. The following examples methods may allow for full independent operation of the ISM device within the wireless device. For example, in one embodiment, the network may signal to the device a list of frequencies or RATs that the device may be allowed to measure and hand off to in case the coexisting technology may be activated. This list may be targeted to LTE wireless devices that have co-existing technologies in the device, or alternatively, the network may signal to the wireless device a list of frequencies which the wireless device may not be allowed to reselect to. Alternatively, the wireless device may autonomously determine the available frequencies it may use for reselection or connection purposes, but excluding the interfered frequencies from the list of network available frequencies.

If this information may be broadcasted (e.g. received at 310) specific to wireless devices equipped with, for example, ISM devices, the wireless device may start measuring these specific frequencies or RATs right after camping on the cell. Alternatively, the wireless device may start measuring these specific frequencies and or RATs only after determining that an ISM device may be active and prone to being interfered by another technology and/or generating interference to another technology, in order to preserve its battery and reduce the measurement load.

Alternatively, if the network may not be signaling these specific frequencies and/or RAT(s), upon receiving a technology activation request for a RAT such as an ISM technology activation request, the wireless device may autonomously start searching/scanning other frequencies and/or RATs before allowing the activation of the ISM device (or other RAT device) or may start performing them while the ISM device has been activated or once interference may be detected. More specifically, the wireless device may start measuring the indicated frequencies and RATs in the system information blocks (SIBs) even if the criteria to start measuring other RATs and frequencies are not met.

Alternatively, the wireless device may autonomously de-prioritize the interference prone frequencies, (e.g. consider them as the lowest priority frequency in the list regardless of what is actually transmitted in the SIBs), when an interfering technology may be activated. For instance, this rule may be applied while the LTE wireless device may be in any frequency and may be performing cell reselection measurements, such that LTE wireless device may avoid reselecting to the interference prone frequency. Once the ISM device (or other RAT device) may be deactivated, for a given period of time, the broadcasted or signaled frequency and RAT priorities may be restored. Alternatively, a separate priority list may be broadcasted separately for coexisting devices. For example, when the criteria above are met, the wireless device may use the dedicated list, otherwise the normal list for all wireless devices may be used. Alternatively, in another example this list may be used by LTE wireless devices that have the co-existing device.

In another alternative embodiment, when the above criteria are met, the LTE wireless device may consider the cell as barred. The cell may be considered barred until the ISM device (or other RAT device) may be deactivated or may have been deactivated for a configured period of time. If the wireless device cannot find any suitable cells in any other frequency or RAT, the wireless device may remove the barring restriction and connect to the cell.

Upon a successful RAT or another safe frequency reselection, the wireless device may allow the ISM device activation (or other RAT device or component activation). Alternatively, the ISM device (or other RAT device or component) may still be activated and the LTE device or component may follow the procedures described herein. In another embodiment, upon receiving an ISM device activation request (or other RAT device activation request), the wireless device may send a connection request message with a new cause: "ISM device activation," for example. Upon receiving this message (e.g. at 308), the network may send a connection reject with a redirection to another frequency or RAT on a safe frequency (which may be received e.g. at 310), allowing for independent operation of both RATs.

After successful reselection/redirection to a safe frequency/RAT, the wireless device may maintain a different frequency/RAT priority list during the ISM device activity (or other RAT device activity) to avoid a cell reselection ping-pong effect. Additionally, the wireless device may apply a temporary barring for the cells on the interference prone frequencies. The cell and frequency barring may be removed once the ISM device (or other RAT device) may be deactivated for a given period of time. The wireless device may report or notify (e.g. via a notification) the network when the ISM device (or other RAT device) may be turned off for a defined amount of time such that the network may configure the wireless device (which may be received e.g. at 310 and processed at 312) to measure the normal (previous) frequencies.

In an example embodiment, upon an ISM device activation request (or other RAT device activation request), the wireless device may start a delay activation timer that may be network signaled or wireless device implemented (e.g. implemented in the wireless device). This timer may be long enough to allow for an alternate frequency/RAT reselection or redirection. Alternatively, there may be two different timers for each operation, or one timer and a scaling factor.

In another embodiment, while in idle mode, the wireless device may synchronize its operation with the ISM device (or other RAT device) protecting its measurement and paging occasions. If there may be data to be transmitted on the current RAT, it may buffer its data and send first a connection request with the ISM device activation clause and then may be re-directed by the network and then start the connection and data transfer on the safe frequency. Additionally, if the wireless device or current RAT may receive a paging, it may deactivate or suspend transmission on the ISM device and proceed with the paging message. Also, if wireless device or current RAT has to receive data or a call, it may move to connected mode and then apply one of the above described connected state procedures.

Once the wireless device has moved out of the interference prone frequency according to any of the solutions (or procedures, methods, rules, and described herein, to minimize ping-ponging and to allow the wireless device to eventually return back to the frequency, the wireless device may be prevented from performing measurement on that frequency or to return to that frequency until the co-existing device has been deactivated, (unless no other frequency may be available in which case the wireless device may still try to go back to the interference prone frequency). Once the technology has been deactivated for a predefined period of time, the wireless device may send a report to the network that the device has been deactivated (e.g. at 308). This may be sent via a RRC message, via a measurement event, or a via a new measurement event. The wireless device may start also measuring the interference prone frequency.

In one embodiment, the wireless device itself may recover from a detected interference situation. For example, referring back to FIG. 3, in one embodiment, the wireless device may not receive information to mitigate the interference situation (e.g. at 310) from the network. Rather, the wireless device may include one or more actions, rules, methods, procedures, and/or protocols therein that may be processed or performed upon detecting an interference event at 302.

For example, as described above, upon detecting an interference event at 302, a communication or interface link may not be established at 304 (e.g. a RLF may occur). In such a situation, the wireless device may process or perform the one or more actions rules, methods, procedures, and/or protocols therein to recover from, mitigate, reduce, or prevent the in-device interference situation as described herein (e.g. at 306).

More specifically, once the interfering device may be activated yielding an interference situation, the interference in the co-existing devices may be severe and prevent the correct reception of data in the wireless device (e.g. a RLF may occur). To enable the device to alleviate and detect this situation, a number of methods dealing with RLF (RLFO, reporting, measurements, and the like) may be employed such as those described below.

In one embodiment, an RLF procedure may be performed by the wireless device or one or more components therein to enable the wireless device to detect the interference situation and essentially cause the WTRU to change cells or frequency. However, the time required to declare a RLF may be quite large and therefore using a RLF procedure configured to be performed by a wireless device may not be sufficient to maintain an acceptable QoS. Additionally, given that the interference generated from the interferer technology may be sporadic in nature, (e.g. depending on the type of data being generated), the conditions to trigger RLF may not persist long enough. As such, to mitigate the effects of the receiver low noise amplifier (LNA) saturation, an improved RLF procedure with a lower latency reaction may be used.

The channel quality indicator (CQI) and/or a SignalQuality (Reference Signal Received Quality (RSRQ) for LTE or Ec/No for UMTS), may also be used by the wireless device to detect such an interference situation.

In one embodiment, upon ISM device activation (e.g. detection of an interference situation at 302), the wireless device may apply a scaling factor to the 'out of synch' counter, (e.g. N310), and/or the RLF timer, (e.g. T310), used for the RLF procedure (e.g. at 306). The scaling factor may be network signaled or provided or wireless device defined (via e.g. its implementation). The configured N310 and/or T310 may be multiplied with this scaling factor to determine the new counter and time to be used in case the 'out-of-synch' are caused due to an co-existing interfering device. Alternatively, a new set of N310 or T310 specific for co-existing components or devices may be provided or configured in the wireless device.

According to an embodiment, to determine when to apply the scaling factor, the wireless device may use the knowledge that a co-existing device may be present (e.g. ISM) and may be activated. When the ISM device (or other RAT device or component) may be activated, the wireless device may start to use the scaled or the new set of parameters to detect and declare RLF. It may be understood that this condition combined with the criteria described below may be used to determine whether an interference notification or report may be sent to the network. For example, in combination to the above criteria, the wireless device may also base the decision to start using a scaled or new set of parameters based on the CQI being below a threshold. Thus, when an out-of-synch may be detected and the CQI may be below the threshold and/or the RSRQ may be below a threshold, the wireless device may use the scaled values.

To handle the detection of sporadic interference, the RLF procedure and/or other procedures triggered by the wireless device (e.g. at 306) including CQI reporting or event reporting, may lead to the following detection mechanism to be performed by the wireless device (also e.g. at 306). For example, the wireless device may base the triggers on the detection of an intermittent interference pattern. Alternatively or additionally, the wireless device may detect Nx consecutive 'out-of-synch' Ny times over a Tx period of time. More specifically, given the nature of the interference, the wireless device may be going in and out-of-synch at different time intervals. As such, it may be beneficial for the wireless device to detect such behavior. Therefore, once the wireless device may receive a Nx consecutive 'out-of-synch,' the wireless device may start a timer Tx. If the trigger for this condition may be met, the wireless device may detect radio link failure (e.g. at 302 and 304) or report this event to the network (e.g. at 308).

The above may also be applied to CQI values or RSRQ values according to an embodiment. For example, a new event may be configured to count the amount of time within a window or measurement sample where the CQI or the RSRQ goes below a threshold over a predefined period. If the amount of times this occurs within the configured period of time exceeds the configured value, (i.e. if this pattern is detected) and the wireless device may be aware that an interfering technology is enabled and generating interference, the wireless device may report this event to the network (e.g. at 308), via a new measurement event or a new RRC message or may execute protocols, procedures, rules, or methods therein to mitigate the interference event (e.g. at 306). According to example embodiments, the RSRQ/CQI thresholds, time period, and counter described above may be configured by the network or predefined in the wireless device.

In one embodiment, the wireless device may adjust the error counter and the RLF timer based on ISM device buffer load (or other RAT device buffer load) or reception and/or transmission rate (e.g. at 306). Alternatively, the wireless device may adjust its RLF declaration parameters based on quality of service or type of service from ISM versus present RAT.

In an additional embodiment, new events/triggers may be defined to enable the wireless device to report the interference to the network at an earlier stage such that the network may take the appropriate actions as described herein or to enable the wireless device to handle the interference situation itself. Such events may be based on the in-device knowledge that an interfering technology may be activated and the following conditions may be met for a configured period of time during interfered subframes or an average of interfered and non-interfered subframes: the RSRQ may be below a threshold; the RSRP may be below a threshold; and/or the CQI values may be below a threshold.

In yet another embodiment, the wireless device may apply different scaling factors (e.g. at 306) for the measurements and time to trigger events, if configured, to speed up a sustained interference from the in-device ISM transmitter (or other RAT transmitter). There may be a new defined event, specific to this problem or an existing event with specific parameters.

Additionally, to mitigate the saturation of the LNA by the ISM transmitter (or other RAT transmitter), the ISM device (or other RAT component or device) may temporarily suspend transmissions while the wireless device performs an action (e.g. at 306) and/or reports the problem, (RLF or an Event as described in the above paragraphs) (e.g. at 308), and receives the network re-action message (e.g. at 310) and completes the network order, (whatever the order may be: handover, connection release with redirection, or carrier(s) reconfiguration)(e.g. at 312).

Optionally, when the above triggers may be met the wireless device may also autonomously start measuring other frequencies or RATs. This may reduce the delay of finding a suitable cell and frequency when a RLF actually occurs.

According to another embodiment, the wireless device may perform the following (e.g. at 306 and/or 312) to mitigate, prevent, reduce, or avoid an interference situation: suspend temporarily the ISM transmitter; reacquire synchronization with the network if lost; send interference notification to the network; wait for network reaction for a certain defined time; receive the network order, (reconfiguration, handover, connection release with redirection to another frequency or RAT and the like); execute the network order successfully; change frequency/RAT priorities in order to avoid the ping-pong effect; restart ISM activity; and/or when the ISM device activity stops or ISM device is turned off, restore the previous priorities and reconfigure for normal operation Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for mitigating interference between radio access technology (RAT) components in a wireless device, the method comprising:

detecting, at the wireless device, an in-device interference situation between a first RAT component and a second RAT component of the wireless device, wherein at least one of the first or second RAT component is a long term evolution (LTE) technology component;

determining, at the wireless device, that at least one of the first or second RAT component is a victim of the in-device interference situation at one or more frequencies;

sending, from the wireless device, a notification of the detected in-device interference situation to an LTE network, wherein the notification comprises information for assisting with the detected in-device interference situation, the information indicating which of the first and/or second RAT component is a victim of the in-device interference situation and indicating the one or more frequencies at which the victim is interfered, the information further comprising one or more suggested parameters associated with a time division multiplexing (TDM) scheme to assist with the detected in-device interference situation; and receiving, at the wireless device, configuration information based on sending the notification of the detected in-device interference situation, wherein the configuration information comprises information associated with a pattern for transmission and/or reception at the wireless device or a change of a pattern for transmission and/or reception at the wireless device.

2. The method of claim 1, wherein the configuration information comprises at least an action or an indication thereof to be performed by the wireless device in response to the detected in-device interference situation to mitigate the detected in-device interference situation.

3. The method of claim 2, further comprising performing at least one of the following: a handover for at least one of the first RAT or second RAT component; a time coordination between transmission or reception on at least one of the first RAT or second RAT component; a redirection to another frequency; an activation of the first RAT or second RAT component; a delayed activation of the first RAT or second RAT component; turning off the first RAT or second RAT component; turning on the first RAT or second RAT component; a denial of transmissions for at least one of the first or second RAT component; a move to a reduced uplink (UL) mode; and power scaling on a frequency band associated with the first RAT or second RAT component.

4. The method of claim 2, further comprising performing at least one of the following in response to receiving the configuration information: applying a configuration for an in-device interfering event; processing information associated with a capability of a network; applying a scaling value; processing a new measurement configuration message; switching to a new frequency band; applying an activation delay for the first or second RAT component; starting the first or second RAT component; keeping the first RAT or second RAT component off; performing a handover; applying measurement control information; applying a reconfiguration; performing a discontinuous reception (DRX) operation; performing a frequency division multiplexing (FDM) operation; performing a TDM operation; performing a frequency division duplex (FDD) half duplex operation.

5. The method of claim 3, wherein the handover comprises an inter-frequency handover.

6. The method of claim 3, wherein the time coordination between transmission or reception on at least one of the first RAT or second RAT component comprises ensuring transmission of a radio signal on at least one of the first or second RAT components does not coincide with reception of another signal on at least one of the first or second RAT components.

7. The method of claim 3, wherein the denial of transmissions is performed during paging and measurement periods.

8. The method of claim 3, wherein the delayed activation of the first RAT or second RAT component is delayed based on at least one of the following: a service priority, an activity, or a procedure.

9. The method of claim 1, wherein the in-device interference situation is detected based on or in response to one or more triggers.

10. The method of claim 9, wherein the one or more triggers comprise at least one of the following: proactive triggers; reactive triggers; a handover being initiated; a change in a mode of operation; a change in a usage scenario change; a change in a service scenario change; an expiration of a timer; a generation of a predetermined load; and a size of a buffer.

11. The method of claim 10, wherein the notification comprises at least one of the following: an indication the first RAT or second RAT component needs to be activated or is activated; an indication the first RAT or second RAT component needs to be turned or is turned on; information associated with the one or more triggers; information associated with technology types causing the in-device interference situation; an indication of a capability of the wireless device to handle the in-device interference situation; information associated with the first or second RAT component; usage scenario requested by the first RAT or second RAT component; service scenario requested by the first RAT or second RAT component; information associated with a timer; information associated with a mode of operation of the first RAT or second RAT component; an indication on when the first or second RAT should be turned on; measurements associated with the first RAT or second RAT component; a hopping frequency associated with the first RAT or second RAT component; a list of frequency supported by the first RAT or second RAT component; an indication of an urgency associated with turning on the first RAT or second RAT component; a request for assisted-global navigation satellite system (A-GNSS); information associated with a source cell; and information associated with a buffer size of the first RAT or second RAT component.

12. The method of claim 10, wherein the reactive triggers are based on one or more events or one or more conditions.

13. The method of claim 12, wherein the one or more events comprise an in-device knowledge that at least one of the first or second RAT components are active and causing interference.

14. The method of claim 12, wherein the one or more conditions comprise at least one of the following: a reference signal received quality (RSRQ), a reference signal received power (RSRP), or a channel quality indicator (CQI).

15. The method of claim 10, wherein, when the one or more triggers comprise the handover, the information for assisting with mitigation of the in-device interference situation is transferred to a target evolved NodeB (eNB) associated with the handover or the target eNB is made aware of the in-device interference situation.

16. The method of claim 10, further comprising sending another notification after the handover takes place.

17. The method of claim 9, wherein the one or more triggers comprise an interference scenario change.

18. The method of claim 17, wherein the interference change scenario comprises the wireless device no longer experiencing the in-device interference situation.

19. The method of claim 1, wherein the notification is sent via at least one of the following: via a radio resource control (RRC) connection establishment procedure, via a new field in a RRC message; via a RRC connection request message, via a RRC connect setup complete message; via a routing area update message; and via a medium access control (MAC) control element.

20. The method of claim 1, wherein the first RAT component supports a first radio technology and the second RAT component supports a second radio technology, and wherein the first and second radio technologies are different.

21. The method of claim 1, wherein the one or more suggested parameters associated with the TDM scheme are associated with a discontinuous (DRX) pattern.

22. The method of claim 21, wherein the one or more suggested parameters comprise at least one of the following: a cycle, a periodicity, a cycle length, an offset, or an active time.

23. The method of claim 1, wherein the information comprises information associated with whether the first RAT component or the second RAT component is an aggressor of the in-device interference situation.

24. The method of claim 1, wherein the notification of the in-device interference situation is sent to the LTE network when the wireless device is not recovering from the in-device interference situation.

25. The method of claim 1, wherein the notification is sent when the in-device interference situation is not an interference situation capable of being mitigated by the wireless device.

26. The method of claim 1, further comprising sending, from the wireless device to the LTE network, a capability of the wireless device to handle the in-device interference situation.

27. The method of claim 1, further comprising receiving, from the LTE network, a configuration for reporting or monitoring the in-device interference situation.

28. The method of claim 27, wherein the notification is sent based on the configuration indicating the wireless device is capable or allowed to send the notification.

29. The method of claim 1, further comprising reporting to the LTE network when the wireless device no longer experiences the in-device interference situation.

30. The method of claim 1, wherein the information for assisting with the in-device interference situation further comprises at least one of the following: an indication on whether the interfering radio access technology is interfering with a downlink (DL) LTE reception; and indication on whether an uplink (UL) LTE transmission is interfering with another radio access technology; and an indication or information associated with whether the UL LTE transmission or DL LTE reception may be interfered with during transmission or reception.

31. A wireless transmit/receive unit (WTRU) for mitigating interference between co-existing radio access technology (RAT) components included therein, the WTRU comprising:
    a processor configured to:
    detect an in-device interference situation between at least a first RAT component and a second RAT component in the WTRU, wherein at least one of the first or second RAT component is a long term evolution (LTE) technology component;
    determine that at least one of the first or second RAT component is a victim of the in-device interference situation at one or more frequencies;
    send a notification of the detected in-device interference situation to an LTE network, wherein the notification comprises information for assisting with the detected in-device interference situation, the information indicating which of the first and/or second RAT component is a victim of the in-device interference situation and indicating the one or more frequencies at which the victim is interfered, the information further comprising one or more suggested parameters associated with a time division multiplexing (TDM) scheme to assist with the in-device interference situation; and
    receive, from the LTE network, configuration information based on sending the notification of the detected in-device interference situation between the first and second RAT components in the WTRU, wherein the configuration information comprises information associated with a pattern for transmission and/or reception at the WTRU or a change of a pattern for transmission and/or reception at the WTRU.

32. The WTRU of claim 31, wherein the configuration information comprises at least an action or an indication thereof to be performed by the WTRU in response to the detected in-device interference situation to mitigate the detected in-device interference situation and wherein the processor is further configured to perform at least one of the following: a handover for at least one of the first RAT or second RAT component; a time coordination between transmission or reception on at least one of the first RAT or second RAT component; a redirection to another frequency; an activation of the first RAT or second RAT component; a delayed activation of the first RAT or second RAT component; turning off the first RAT or second RAT component; turning on the first RAT or second RAT component; a denial of transmissions for at least one of the first or second RAT component; a move to a reduced uplink (UL) mode; and power scaling on a frequency band associated with the first RAT or second RAT component.

33. The WTRU of claim 32, wherein the handover comprises an inter-frequency handover.

34. The WTRU of claim 32, wherein the processor is configured to remove one or more cells to provide frequency separation between the first and second RAT components.

35. The WTRU of claim 32, wherein the time coordination between transmission or reception on at least one of the first RAT or second RAT component comprises ensuring transmission of a radio signal on at least one of the first or second RAT components does not coincide with reception of another signal on at least one of the first or second RAT components.

36. The WTRU of claim 32, wherein the denial of transmissions is performed during paging and measurement periods.

37. The WTRU of claim 32, wherein the delayed activation of the first RAT or second RAT component is delayed based on at least one of the following: a service priority, an activity, or a procedure.

38. The WTRU of claim 31, wherein the processor is configured to perform at least one of the following in response to receiving the configuration information: applying a configuration for an in-device interfering event; processing information associated with a capability of a network; applying a scaling value; processing a new measurement configuration message; switching to a new frequency band; applying an activation delay for the first or second RAT component; starting the first or second RAT component; keeping the first RAT or second RAT component off; performing a handover; applying measurement control information; applying a reconfiguration; performing a discontinuous reception (DRX) operation; performing a frequency division multiplexing (FDM) operation; performing a TDM operation; performing a frequency division duplex (FDD) half duplex operation.

39. The WTRU of claim 31, wherein the in-device interference situation is detected based on or in response to one or more triggers.

40. The WTRU of claim 39, wherein the one or more triggers comprise at least one of the following: proactive triggers; reactive triggers; a handover being initiated; a change in a mode of operation; a change in a usage scenario change; a change in a service scenario change; an expiration of a timer; a generation of a predetermined load; and a size of a buffer.

41. The WTRU of claim 40, wherein the notification comprises at least one of the following: an indication the first RAT or second RAT component needs to be activated or is activated; an indication the first RAT or second RAT component needs to be turned or is turned on; information associated with the one or more triggers; information associated with technology types causing the in-device interference situation; an indication of a capability of the WTRU to handle the in-device interference situation; information associated with the first or second RAT component; usage scenario requested by the first RAT or second RAT component; service scenario requested by the first RAT or second RAT component; information associated with a timer; information associated with a mode of operation of the first RAT or second RAT component; an indication on when the first or second RAT should be turned on; measurements associated with the first RAT or second RAT component; a hopping frequency associated with the first RAT or second RAT component; a list of frequency supported by the first RAT or second RAT component; an indication of an urgency associated with turning on the first RAT or second RAT component; a request for assisted-global navigation satellite system (A-GNSS); information associated with a source cell; and information associated with a buffer size of the first RAT or second RAT component.

42. The WTRU of claim 40, wherein the reactive triggers are based on one or more events or one or more conditions.

43. The WTRU of claim 42, wherein the one or more events comprise an in-device knowledge that at least one of the first or second RAT components is active and causing interference.

44. The WTRU of claim 42, wherein the one or more conditions comprise at least one of the following: a reference signal received quality (RSRQ), a reference signal received power (RSRP), or a channel quality indicator (CQI).

45. The WTRU of claim 40, wherein, when the one or more triggers comprise the handover, the information for assisting with mitigation of the in-device interference situation is transferred to a target evolved NodeB (eNB) associated with the handover or the target eNB is made aware of the in-device interference situation.

46. The WTRU of claim 40, wherein the processor is further configured to send another notification after the handover takes place.

47. The WTRU of claim 39, wherein the one or more triggers comprise an interference scenario change.

48. The WTRU of claim 47, wherein the interference scenario change comprises the WTRU no longer experiencing the in-device interference situation.

49. The WTRU of claim 31, wherein the notification is sent via at least one of the following: via a radio resource control (RRC) connection establishment procedure; via a new field in a RRC message; via a RRC connection request message; via a RRC connect setup complete message; via a routing area update message; and via a medium access control (MAC) control element.

50. The WTRU of claim 31, wherein the first RAT component supports a first radio technology and the second RAT component supports a second radio technology, and wherein the first and second radio technologies are different.

51. The WTRU of claim 31, wherein the one or more suggested parameters associated with the time division multiplexing (TDM) scheme are associated with a discontinuous (DRX) pattern.

52. The WTRU of claim 51, wherein the one or more suggest parameters comprise at least one of the following: a cycle, a cycle length, an offset, or an active time.

53. The WTRU of claim 31, wherein the information comprises an indication of whether the first RAT component or the second RAT component is an aggressor of the interference situation.

54. The WTRU of claim 31, wherein the notification of the in-device interference situation is sent to the LTE network when the WTRU is not recovering from the in-device interference situation.

55. The WTRU of claim 31, wherein the notification is sent when the in-device interference situation is not an interference situation capable of being mitigated by the WTRU.

56. The WTRU of claim 31, wherein the processor is further configured to send, from the WTRU to the LTE network, a capability of the WTRU to handle the in-device interference situation.

57. The WTRU of claim 31, wherein the processor is further configured to receive, from the LTE network, a configuration for reporting or monitoring the in-device interference situation.

58. The WTRU of claim 57, wherein the notification is sent based on the configuration indicating the WTRU is capable or allowed to send the notification.

59. The WTRU of claim 31, wherein the processor is further configured to report to the LTE network when the WTRU no longer experiences the in-device interference situation.

60. The WTRU of claim 31, wherein the information for assisting with the in-device interference situation further comprises at least one of the following: an indication on whether the interfering radio access technology is interfering the downlink (DL) LTE reception; and indication on whether the uplink (UL) LTE is interfering with the other radio access technology; and an indication or information associated with whether the UL or DL may be interfered with during transmission or reception.

61. A method for mitigating interference between radio access technology (RAT) components in a wireless device, the method comprising:
    detecting an in-device interference situation between a first RAT component and a second RAT component in the wireless device, wherein at least one of the first or second RAT component is a long term evolution (LTE) technology component;
    determining that at least one of the first or second RAT component is a victim of the in-device interference situation at one or more frequencies;
    sending a notification of the detected in-device interference situation to an LTE network, wherein the notification comprises information for assisting with the detected in-device interference situation, the information indicating which of the first and/or second RAT component is a victim of the in-device interference situation and indicating the one or more frequencies at which the victim is interfered, the information further comprising one or more suggested parameters associated with a time division multiplexing (TDM) scheme to assist with the in-device interference situation;
    receiving, from the LTE network, an action or an indication thereof to be performed by the wireless device in response to the notification, wherein the action is associated with applying a pattern for transmission and/or reception at the wireless device or a change of a pattern for transmission and/or reception at the wireless device; and
    performing the action to mitigate the detected in-device interference situation.

62. The method of claim 61, wherein the in-device interference situation is detected based on one or more triggers comprising at least one of the following: proactive triggers; reactive triggers; a handover being initiated; a change in a mode of operation; a change in a usage scenario change; a change in a service scenario change; an expiration of a timer; a generation of a predetermined load; and a size of a buffer.

63. The method of claim 62, wherein, when the one or more triggers comprise the handover, the information for assisting with mitigation of the in-device interference situation is transferred to a target evolved NodeB (eNB) associated with the handover or the target eNB is made aware of the interference situation.

64. The method of claim 62, further comprising sending another notification after the handover takes place.

65. The method of claim 61, wherein the first RAT component supports a first radio technology and the second RAT component supports a second radio technology, and wherein the first and second radio technologies are different.

* * * * *